United States Patent
Fu et al.

(10) Patent No.: US 9,641,098 B2
(45) Date of Patent: May 2, 2017

(54) MULTI-LEVEL INVERTER APPARATUS AND METHOD

(71) Applicant: Futurewei Technologies, Inc., Plano, TX (US)

(72) Inventors: Dianbo Fu, Plano, TX (US); Yunfeng Liu, Shanghai (CN); Yongbing Gao, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 87 days.

(21) Appl. No.: 14/656,611

(22) Filed: Mar. 12, 2015

(65) Prior Publication Data

US 2016/0268924 A1 Sep. 15, 2016

(51) Int. Cl.
*H02M 7/537* (2006.01)
*H02M 7/483* (2007.01)
*H02M 7/487* (2007.01)

(52) U.S. Cl.
CPC ............ *H02M 7/483* (2013.01); *H02M 7/487* (2013.01)

(58) Field of Classification Search
CPC ....... H02M 7/537; H02M 7/483; H02M 7/487
See application file for complete search history.

(56) References Cited

U.S. PATENT DOCUMENTS

| | | | | |
|---|---|---|---|---|
| 2013/0107599 | A1* | 5/2013 | Shekhawat | H02M 7/487 363/131 |
| 2014/0098587 | A1* | 4/2014 | Yatsu | H02M 7/483 363/131 |
| 2014/0293667 | A1* | 10/2014 | Schroeder | H02M 7/483 363/60 |
| 2016/0043659 | A1* | 2/2016 | Xu | H02M 7/537 363/131 |

* cited by examiner

*Primary Examiner* — Jue Zhang
(74) *Attorney, Agent, or Firm* — Slater Matsil, LLP

(57) ABSTRACT

An inverter comprises a first input capacitor and a second input capacitor connected in series, an inverting unit comprising a first switch, a second switch, a third switch and a fourth switch connected in series, wherein the inverting unit is connected to an input of an L-C filter, a first bidirectional conductive path connected between a common node of the first switch and the second switch, and a common node of the first input capacitor and the second input capacitor, a second bidirectional conductive path connected between a common node of the third switch and the fourth switch, and the common node of the first input capacitor and the second input capacitor and a flying capacitor connected between the common node of the first switch and the second switch, and the common node of the third switch and the fourth switch.

6 Claims, 20 Drawing Sheets

| Va | MODE | SWITCH STATUS | | | | | | | |
|---|---|---|---|---|---|---|---|---|---|
| | | Q1 | Q2 | Q3 | Q4 | Q5 | Q6 | Q7 | Q8 |
| E/2 | MODE 1 | 1 | 1 | 0 | 0 | 1 | 0 | 0 | 1 |
| E/4 | MODE 1 | 1 | 0 | 1 | 0 | 1 | 0 | 0 | 1 |
| E/4 | MODE 2 | 0 | 1 | 0 | 0 | 1 | 1 | 0 | 1 |
| 0 | MODE 1 | 0 | 0 | 1 | 0 | 1 | 1 | 0 | 1 |
| 0 | MODE 2 | 0 | 1 | 0 | 0 | 0 | 1 | 1 | 1 |
| -E/4 | MODE 2 | 0 | 0 | 1 | 0 | 0 | 1 | 1 | 1 |
| -E/4 | MODE 1 | 0 | 1 | 0 | 1 | 0 | 1 | 1 | 0 |
| -E/2 | MODE 1 | 0 | 0 | 1 | 1 | 0 | 1 | 1 | 0 |

| Va | MODE | SWITCH STATUS ||||||||| SWITCH STRESS |||||||||
|---|---|---|---|---|---|---|---|---|---|---|---|---|---|---|---|---|
| | | Q1 | Q2 | Q3 | Q4 | Q5 | Q6 | Q7 | Q8 | Q1 | Q2 | Q3 | Q4 | Q5 | Q6 | Q7 | Q8 |
| E/2 | MODE 1 | 1 | 1 | 0 | 0 | 1 | 0 | 0 | 1 | 0 | 0 | E/4 | 3E/4 | 0 | E/4 | E/2 | 0 |
| E/4 | MODE 1 | 1 | 0 | 1 | 0 | 1 | 0 | 0 | 1 | 0 | E/4 | 0 | 3E/4 | 0 | E/4 | E/2 | 0 |
| | MODE 2 | 0 | 1 | 0 | 0 | 1 | 1 | 0 | 1 | E/4 | 0 | E/4 | E/2 | 0 | 0 | E/4 | 0 |
| 0 | MODE 1 | 0 | 0 | 1 | 0 | 1 | 1 | 0 | 1 | E/4 | E/4 | 0 | E/2 | 0 | 0 | E/4 | 0 |
| | MODE 2 | 0 | 1 | 0 | 0 | 0 | 1 | 1 | 1 | E/2 | 0 | E/4 | E/4 | E/4 | 0 | 0 | 0 |
| -E/4 | MODE 2 | 0 | 0 | 1 | 1 | 0 | 1 | 1 | 1 | E/2 | E/4 | 0 | E/4 | E/4 | 0 | 0 | 0 |
| | MODE 1 | 0 | 1 | 0 | 1 | 0 | 1 | 1 | 0 | 3E/4 | 0 | E/4 | 0 | E/2 | 0 | 0 | E/4 |
| -E/2 | MODE 1 | 0 | 0 | 1 | 1 | 0 | 1 | 1 | 0 | 3E/4 | E/4 | 0 | 0 | E/2 | 0 | 0 | E/4 |

FIG. 11

| Va | MODE | SWITCH STATUS | | | | | | | |
|---|---|---|---|---|---|---|---|---|---|
| | | Q1 | Q2 | Q3 | Q4 | Q5 | Q6 | Q7 | Q8 |
| E/2 | MODE 1 | 1 | 1 | 0 | 0 | 1 | 0 | 0 | 1 |
| E/4 | MODE 1 | 1 | 0 | 1 | 0 | 1 | 0 | 0 | 1 |
| 0 | MODE 1 | 0 | 0 | 1 | 0 | 1 | 1 | 0 | 1 |
| | MODE 2 | 0 | 1 | 0 | 0 | 0 | 1 | 1 | 1 |
| -E/4 | MODE 2 | 0 | 0 | 1 | 0 | 0 | 1 | 1 | 1 |
| -E/2 | MODE | 0 | 0 | 1 | 1 | 0 | 1 | 1 | 0 |

FIG. 13

| Va | MODE | SWITCH STATUS | | | | | | | |
|---|---|---|---|---|---|---|---|---|---|
| | | Q1 | Q2 | Q3 | Q4 | Q5 | Q6 | Q7 | Q8 |
| E/2 | MODE 1 | 1 | 1 | 0 | 0 | 1 | 0 | 0 | 1 |
| E/4 | MODE 2 | 0 | 1 | 0 | 0 | 1 | 1 | 0 | 1 |
| 0 | MODE 1 | 0 | 0 | 1 | 0 | 1 | 1 | 0 | 1 |
| | MODE 2 | 0 | 1 | 0 | 0 | 0 | 1 | 1 | 1 |
| -E/4 | MODE 1 | 0 | 1 | 0 | 1 | 0 | 1 | 1 | 0 |
| -E/2 | MODE 1 | 0 | 0 | 1 | 1 | 0 | 1 | 1 | 0 |

FIG. 15

| Va | MODE | SWITCH STATUS | | | | | | | |
|---|---|---|---|---|---|---|---|---|---|
| | | Q1 | Q2 | Q3 | Q4 | Q5 | Q6 | Q7 | Q8 |
| E/2 | MODE 1 | 1 | 1 | 0 | 0 | 1 | 0 | 0 | 1 |
| E/4 | MODE 1 | 1 | 0 | 1 | 0 | 1 | 0 | 0 | 1 |
| | MODE 2 | 0 | 1 | 0 | 0 | 1 | 1 | 0 | 1 |
| 0 | MODE 1 | 0 | 0 | 1 | 0 | 1 | 1 | 0 | 1 |
| | MODE 2 | 0 | 1 | 0 | 0 | 0 | 1 | 1 | 1 |
| -E/4 | MODE 2 | 0 | 0 | 1 | 0 | 0 | 1 | 1 | 1 |
| | MODE 1 | 0 | 1 | 0 | 1 | 0 | 1 | 1 | 0 |
| -E/2 | MODE 1 | 0 | 0 | 1 | 1 | 0 | 1 | 1 | 0 |

FIG. 18

MULTI-LEVEL INVERTER APPARATUS AND METHOD

TECHNICAL FIELD

The present invention relates to a multilevel inverter device and method, and, in particular embodiments, to a five-level inverter apparatus and method for solar applications.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. A plurality of multilevel inverter topologies may be employed to achieve high power as well as high efficiency conversion from solar energy to utility electricity. In particular, a high power ac output can be achieved by using a series of power semiconductor switches to convert a plurality of low voltage dc sources to a high power ac output by synthesizing a staircase voltage waveform.

In accordance with the topology difference, multilevel inverters may be divided into three categories, namely diode clamped multilevel inverters, flying capacitor multilevel inverters and cascaded H-bridge multilevel inverters. Furthermore, multilevel inverters may employ different pulse width modulation (PWM) techniques such as sinusoidal PWM (SPWM), selective harmonic elimination PWM, space vector modulation and the like. Multilevel inverters are a common power topology for high and medium power applications such as utility interface for renewable power sources, flexible ac transmission systems, medium voltage motor drive systems and the like.

The diode clamped multilevel inverter is commonly referred to as a three-level neutral point clamped (NCP) inverter. A three-level NCP inverter requires two series connected capacitors coupled between the input dc buses. Each capacitor is charged to an equal potential. Furthermore, the three-level NCP inverter may comprise four switching elements and two clamping diodes. The clamping diodes help to reduce the voltage stress on the switching element to one capacitor voltage level.

An NCP inverter utilizes a staircase waveform to generate an ac output. Such a staircase waveform resembles a desired sinusoidal waveform. As a result, the output voltage of the NCP inverter may be of a low total harmonic distortion (THD). In addition, the staircase waveform may reduce the voltage stresses. As a result, the electromagnetic compatibility (EMC) performance of the NCP inverter may be improved. In addition, to achieve the same THD, the NCP inverter may operate at a lower switching frequency. Such a lower switching helps to reduce switching losses so as to achieve an efficient power conversion system.

SUMMARY OF THE INVENTION

These and other problems are generally solved or circumvented, and technical advantages are generally achieved, by preferred embodiments of the present invention which provide an apparatus of five-level inverters in solar applications.

In accordance with an embodiment, an inverter comprises a first input capacitor and a second input capacitor connected in series, an inverting unit comprising a first switch, a second switch, a third switch and a fourth switch connected in series, wherein the inverting unit is connected to an input of an L-C filter, a first bidirectional conductive path connected between a common node of the first switch and the second switch, and a common node of the first input capacitor and the second input capacitor, a second bidirectional conductive path connected between a common node of the third switch and the fourth switch, and the common node of the first input capacitor and the second input capacitor and a flying capacitor connected between the common node of the first switch and the second switch, and the common node of the third switch and the fourth switch.

In accordance with another embodiment, a system comprises an input dc power source having a positive terminal connected to a positive terminal of a first input capacitor and a negative terminal connected to a negative terminal of a second input capacitor, wherein the first input capacitor and the second input capacitor are connected in series, an inverting unit comprising a first switch, a second switch, a third switch and a fourth switch connected in series, wherein the inverting unit is connected to an input of an L-C filter and the inverting unit is connected to a common node of the first input capacitor and the second input capacitor through a first bidirectional conductive path and a second bidirectional conductive path and a flying capacitor having a first terminal connected to a common node of the first bidirectional conductive path and the inverting unit, and a second terminal connected to a common node of the second bidirectional conductive path and the inverting unit.

In accordance with yet another embodiment, a method comprises providing a five-level inverter comprising a first switch, a second switch, a third switch and a fourth switch connected in series, wherein the first switch is connected to a first voltage potential equal to $E/2$, the fourth switch is connected to a second voltage potential equal to $-E/2$, a common node of the third switch and the fourth switch is connected to a neutral point through a first bidirectional switch, a common node of the first switch and the second switch is connected to the neutral point through a second bidirectional switch, a common node of the second switch and the third switch is connected to an input of an L-C filter and the common node of the third switch and the fourth switch is connected to the common node of the first switch and the second switch through a flying capacitor, and wherein a voltage across the flying capacitor is equal to $E/4$.

The method further comprises supplying control signals to the first switch, the second switch, the third switch, the fourth switch, the first bidirectional switch and the second bidirectional switch, wherein the control signals are configured such that five voltage potentials are produced at the input of the L-C filter, and wherein the five voltage potentials are $E/2$, $E/4$, 0, $-E/4$ and $-E/2$.

An advantage of an embodiment of the present invention is generating a staircase waveform using a five-level inverter having a flying capacitor. The flying capacitor helps to reduce the voltage stresses on the switching elements of the five-level inverter so as to improve the efficiency, reliability and cost of the five-level inverter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 illustrates a table including the voltage stresses of all switches under eight operating modes of the five-level inverter in accordance with various embodiments of the present disclosure;

FIG. 13 illustrates switch on/off statuses under the modulation scheme shown in FIG. 12 in accordance with various embodiments of the present disclosure;

FIG. 15 illustrates switch on/off statuses under the modulation scheme shown in FIG. 14 in accordance with various embodiments of the present disclosure;

FIG. 18 illustrates switch on/off statuses under the modulation scheme shown in FIGS. 16-17 in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a five-level inverter. The invention may also be applied, however, to a variety of multi-level power converters including seven-level inverters, nine-level inverters and the like.

Figure 1:
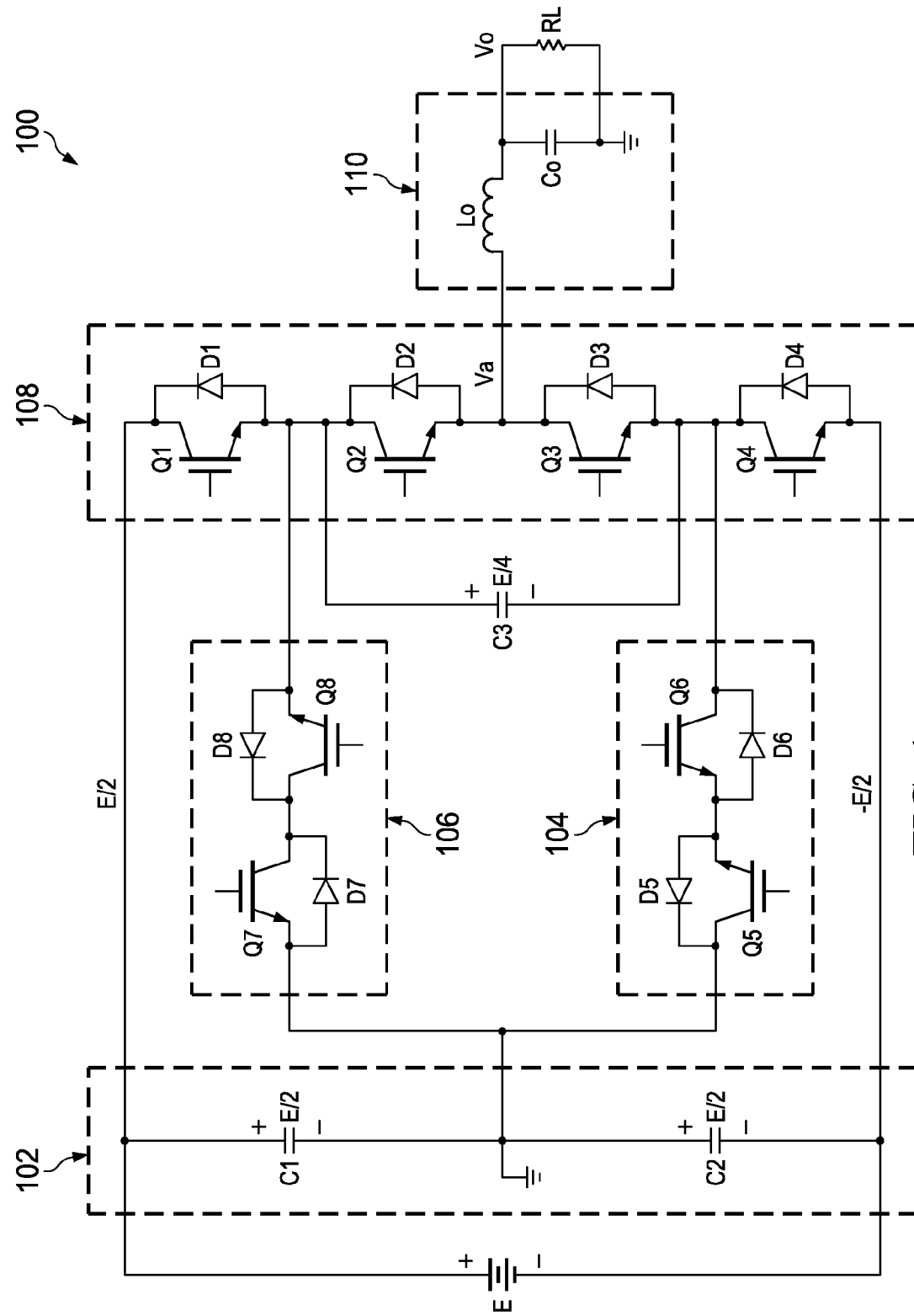
FIG. 1 illustrates a schematic diagram of a five-level inverter in accordance with various embodiments of the present disclosure.

FIG. 1 illustrates a schematic diagram of a five-level inverter in accordance with various embodiments of the present disclosure. The five-level inverter 100 is coupled between an input direct current (dc) power source E and a load RL as shown in FIG. 1. The input dc power source E may be a solar panel array. Alternatively, the input dc power source E may be an energy storage device such as rechargeable batteries, fuel cells and/or the like.

As shown in FIG. 1, the five-level inverter 100 comprises an input dc link 102, a first bidirectional middle switch 104, a second bidirectional middle switch 106, a flying capacitor C3, an inverting unit 108 and an output L-C filter 110. The output L-C filter 110 has an input connected to a node Va and an output connected to a node Vo as shown in FIG. 1.

The input dc link 102 comprises two input capacitors, namely a first capacitor C1 and a second capacitor C2 connected in series between two output terminals of the input dc power source E. In some embodiment, the first capacitor C1 and the second capacitor C2 have the same capacitance. As a result, the voltage applied to the input dc link 102 is divided evenly across each capacitor as shown in FIG. 1. More particularly, the first capacitor C1 has an output voltage E/2 with reference to the common node of capacitors C1 and C2 Likewise, the second capacitor C2 has an output voltage −E/2 with reference to the common node of capacitors C1 and C2. The common node of capacitors C1 and C2 is connected to ground according to some embodiments. The common node of capacitors C1 and C2 may be alternatively referred to as a neutral point of the five-level inverter 100 throughout the description.

It should be noted that while FIG. 1 illustrates the five-level inverter 100 with two input capacitors (e.g., the first capacitor C1 and the second capacitor C2), the five-level inverter 100 could accommodate any number of input capacitors. The number of input capacitors illustrated herein is limited solely for the purpose of clearly illustrating the inventive aspects of the various embodiments. The present invention is not limited to any specific number of input capacitors. One of ordinary skill in the art would recognize many variations, alternatives, and modifications. For example, additional capacitors may be employed to achieve an output staircase waveform having additional voltage levels.

The first bidirectional middle switch 104 comprises switches Q5 and Q6 connected in series between a common node of switches Q3 and Q4, and the common node C1 and C2. As shown in FIG. 1, the first bidirectional middle switch 104 is a back-to-back connected switch. Likewise, the second bidirectional middle switch 106 is a back-to-back connected switch coupled between a common node of switches Q1 and Q2, and the common node C1 and C2.

In accordance with an embodiment, the switches (e.g., switches Q1-Q8) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted that when switches Q1-Q8 are implemented by MOSFET devices, the body diodes of switches Q1-Q8 can be used to provide a freewheeling channel. On the other hand, when switches Q1-Q8 are implemented by IGBT devices, a separate freewheeling diode is required to be connected in parallel with its corresponding switch.

As shown in FIG. 1, diodes D1, D2, D3, D4, D5, D6, D7 and D8 are required to provide reverse conducting paths for the five-level inverter 100. In other words, diodes D1-D8 are anti-parallel diodes. In some embodiments, diodes D1-D8 are co-packaged with their respective IGBT devices. In alternative embodiments, diodes D1-D8 are placed outside their respective IGBT devices. The operation scheme of switches Q1-Q8 will be described below with respect to FIGS. 2-10.

It should further be noted that while FIG. 1 shows each bidirectional switch is formed by diodes and IGBT devices connected in an anti-parallel arrangement, one of ordinary skill in the art would recognize many variations, alternatives and modifications. For example, the bidirectional switch may be implemented by some new semiconductor switches such as anti-paralleled reverse blocking IGBTs arrangement.

The inverting unit 108 comprises switches Q1, Q2, Q3 and Q4 connected in series between a positive terminal of C1 and a negative terminal of C2. As shown in FIG. 1, the collector of switch Q1 is connected to the positive terminal of C1. The common node of Q1 and Q2 is connected to the neutral point through the second bidirectional middle switch 106. The common node of Q2 and Q3 is connected to an input terminal (node Va) of the output L-C filter 110. The common node of Q3 and Q4 is connected to the neutral point through the first bidirectional middle switch 104. The emitter of switch Q4 is connected to the negative terminal of C2.

The five-level inverter 100 further comprises a flying capacitor C3 connected between a common node of Q1 and Q2, and a common node of Q3 and Q4. As shown in FIG. 1, the positive terminal of the flying capacitor C3 is connected to the common node of Q1 and Q2. The negative terminal of the flying capacitor C3 is connected to the common node of Q3 and Q4. In some embodiments, the voltage across the positive terminal and the negative terminal of the flying capacitor C3 is equal to E/4.

In some embodiments, switches Q2 and Q3 are controlled by a pair of control signals complementary to each other; switches Q1 and Q6 are controlled by a pair of control signals complementary to each other; switches Q4 and Q8 are controlled by a pair of control signals complementary to each other; switches Q5 and Q7 are controlled by a pair of control signals complementary to each other. By controlling the on and off states of Q1-Q8, the node Va may have five different voltage levels. The five voltage levels at the node Va include E/2, E/4, 0, −E/4 and −E/2. The detailed operation of producing these five voltage levels will be described below with respect to FIGS. 2-10.

Figure 2:
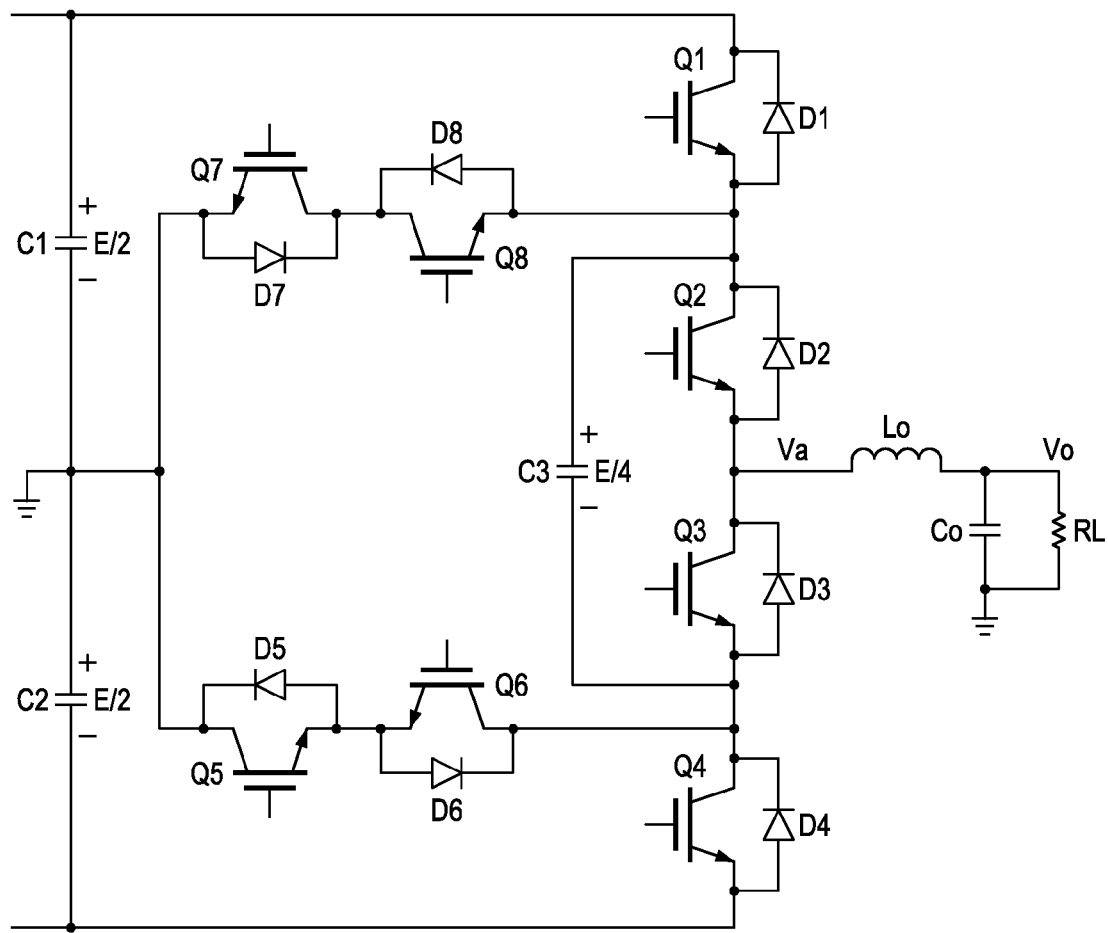
FIG. 2 illustrates various operating modes and their corresponding switch on/off statuses in accordance with various embodiments of the present disclosure.

FIG. 2 illustrates various operating modes and their corresponding switch on/off statuses in accordance with various embodiments of the present disclosure. As shown in FIG. 2, there may be eight operating modes for producing voltage levels E/2, E/4, 0, −E/4 and −E/2. In the table shown in FIG. 2, a logic "1" state represents a switch being on. A logic "0" state represents a switch being off.

The output of the five-level inverter 100 comprises five voltage levels, namely E/2, E/4, 0, −E/4 and −E/2. For a particular output voltage, there are one or two operating modes. In order to produce an output voltage equal to E/2, the switches are controlled under a single operating mode. As shown in the switch status table, switches Q1, Q2, Q5 and Q8 are turned on as indicated by the logic "1" state. On the other hand, switches Q3, Q4, Q6 and Q7 are turned off as indicated by the logic "0" state. The detailed operating principle of the operating mode for producing E/2 at the node Va of the five-level inverter 100 will be described below with respect to FIG. 3.

As shown in the switch status table, there are two operating modes for producing an output voltage equal to E/4. At a first operating mode for producing E/4, switches Q1, Q3, Q5 and Q8 are turned on as indicated by the logic "1" state. Switches Q2, Q4, Q6 and Q7 are turned off as indicated by the logic "0" state. At a second operating mode for producing E/4, switches Q2, Q5, Q6 and Q8 are turned on as indicated by the logic "1" state. Switches Q1, Q3, Q4 and Q7 are turned off as indicated by the logic "0" state. The detailed operating principle of the operating modes for producing E/4 at the node Va of the five-level inverter 100 will be described below with respect to FIGS. 4-5.

It should be noted that the two operating modes for producing the output voltage equal to E/4 may be used to control the voltage ripple across the two terminals of the flying capacitor C3. The detailed operating principle of this ripple control mechanism will be described below with respect to FIG. 16.

As shown in the switch status table, there are two operating modes for producing an output voltage equal to zero. At a first operating mode for producing a zero output voltage, switches Q3, Q5, Q6 and Q8 are turned on as indicated by the logic "1" state. Switches Q1, Q2, Q4 and Q7 are turned off as indicated by the logic "0" state. At a second operating mode for producing the zero output voltage, switches Q2, Q6, Q7 and Q8 are turned on as indicated by the logic "1" state. Switches Q1, Q3, Q4 and Q5 are turned off as indicated by the logic "0" state. The detailed operating principle of the operating modes for producing the zero output voltage will be described below with respect to FIGS. 6-7.

It should be noted that the two operating modes for producing the zero output voltage at the node Va may be used to control neutral point voltage fluctuations (voltage fluctuations at the common node of capacitors C1 and C2). The detailed operating principle of this ripple control mechanism will be described below with respect to FIG. 19.

As shown in the switch status table, there are two operating modes for producing an output voltage equal to −E/4. At a first operating mode for producing −E/4, switches Q2, Q4, Q6 and Q7 are turned on as indicated by the logic "1" state. Switches Q1, Q3, Q5 and Q8 are turned off as indicated by the logic "0" state. At a second operating mode for producing −E/4, switches Q3, Q6, Q7 and Q8 are turned on as indicated by the logic "1" state. Switches Q1, Q2, Q4 and Q5 are turned off as indicated by the logic "0" state. The detailed operating principle of the operating modes for producing −E/4 at the node Va of the five-level inverter 100 will be described below with respect to FIGS. 8-9.

It should be noted that the two operating modes for producing the output voltage equal to −E/4 may be used to control the voltage ripple across the two terminals of the flying capacitor C3. The detailed operating principle of this ripple control mechanism will be described below with respect to FIG. 17.

As shown in the switch status table, there is a single operating mode for producing an output voltage equal to −E/2. Switches Q3, Q4, Q6 and Q7 are turned on as indicated by the logic "1" state. Switches Q1, Q2, Q5 and Q8 are turned off as indicated by the logic "0" state. The detailed operating principle of the operating mode for producing −E/2 at the node Va of the five-level inverter will be described below with respect to FIG. 10.

Figure 3:
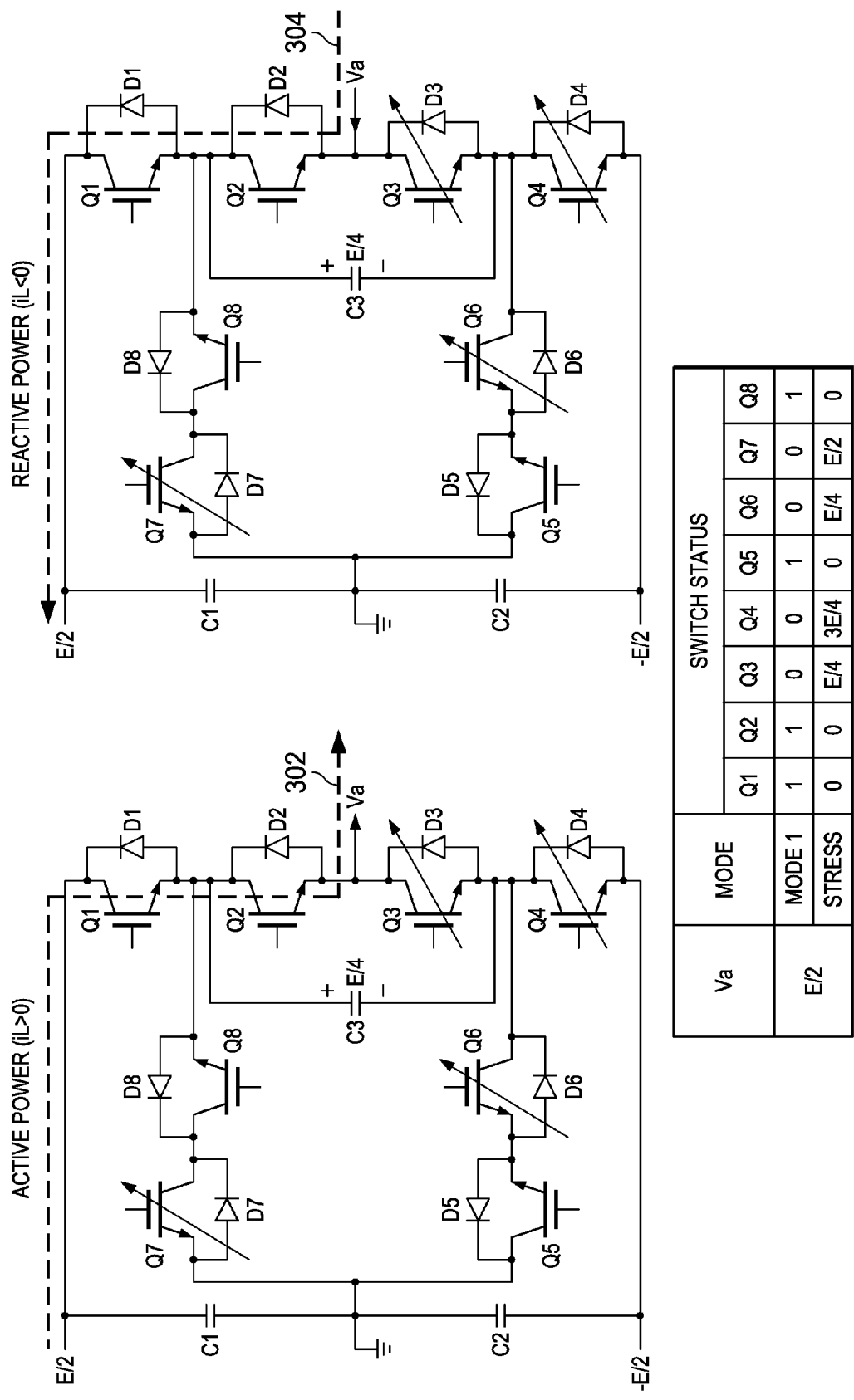
FIG. 3 illustrates the voltage stress of each switch under the operating mode for producing E/2 at the output of the five-level inverter in accordance with various embodiments of the present disclosure.

FIG. 3 illustrates the voltage stress of each switch under the operating mode for producing E/2 at the output of the five-level inverter in accordance with various embodiments of the present disclosure. In some embodiments, both active power and reactive power may flow through the five-level inverter 100 shown in FIG. 3. During the phase of active power flowing through the five-level inverter 100, the inductor current iL (current flowing through the output inductor Lo) is greater than zero when the output voltage of the five-level inverter is equal to E/2. On the other hand, during the phase of reactive power flowing through the five-level inverter, the inductor current iL is less than zero.

During the phase of active power flowing through the five-level inverter, a first conductive path is enabled as indicated by the dashed line 302 shown in FIG. 3. The first conductive path is formed by Q1 and Q2. The current flows from the positive terminal of the capacitor C1 to the node Va. As a result, the output voltage at Vo is approximately equal to E/2.

During the phase of reactive power flowing through the five-level inverter, a second conductive path is enabled as indicated by the dashed line 304 shown in FIG. 3. The second conductive path is formed by D1 and D2. The current flows from the node Va to the positive terminal of the capacitor C1.

During both phases described above, switches Q3, Q4, Q6 and Q7 are turned off as indicated by the arrows placed on top of the symbols of Q3, Q4, Q6 and Q7. The voltage stress on the turned-off Q3 is equal to E/4; the voltage stress on the turned-off Q4 is equal to 3E/4; the voltage stress on the turned-off Q6 is equal to E/4; the voltage stress on the turned-off Q7 is equal to E/2.

Switches Q1, Q2, Q5 and Q8 are turned on. It should be noted that while switches Q5 and Q8 are turned on, there are no currents flowing through the turned-on Q5 and Q8.

Figure 4:
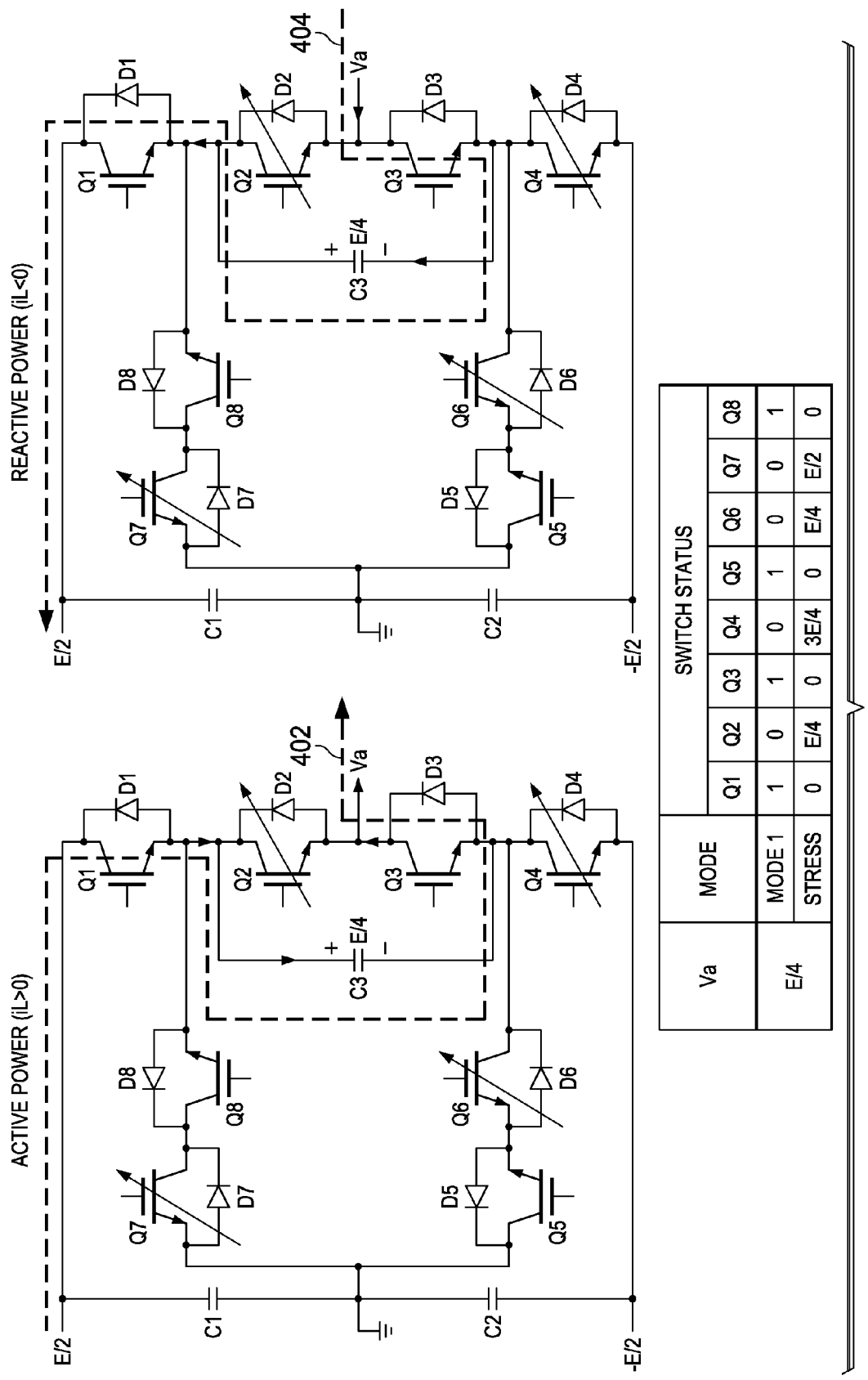
FIG. 4 illustrates the voltage stress of each switch under the first operating mode for producing E/4 at the output of the five-level inverter in accordance with various embodiments of the present disclosure.

FIG. 4 illustrates the voltage stress of each switch under the first operating mode for producing E/4 at the output of the five-level inverter in accordance with various embodiments of the present disclosure. During the phase of active power flowing through the five-level inverter 100, a first conductive path is enabled as indicated by the dashed line 402 shown in FIG. 4. The first conductive path is formed by Q1, C3 and D3. The current flows from the positive terminal of the capacitor C1 to the node Va. In some embodiments, the voltage across the terminals of C3 is equal to E/4 as shown in FIG. 4. The output voltage is equal to the voltage across C1 (E/2) minus the voltage across C3 (E/4). In other words, the output voltage at the node Va is approximately equal to E/4.

During the phase of reactive power flowing through the five-level inverter, a second conductive path is enabled as indicated by the dashed line 404 shown in FIG. 4. The second conductive path is formed by Q3, C3 and D1. The current flows from the node Va to the positive terminal of the capacitor C1.

During both phases described above, switches Q2, Q4, Q6 and Q7 are turned off as indicated by the arrows placed on top of the symbols of Q2, Q4, Q6 and Q7. The voltage stress on the turned-off Q2 is equal to E/4; the voltage stress on the turned-off Q4 is equal to 3E/4; the voltage stress on the turned-off Q6 is equal to E/4; the voltage stress on the turned-off Q7 is equal to E/2.

Switches Q1, Q3, Q5 and Q8 are turned on. It should be noted that while switches Q5 and Q8 are turned on, there may be no currents flowing through the turned-on Q5 and Q8.

Figure 5:
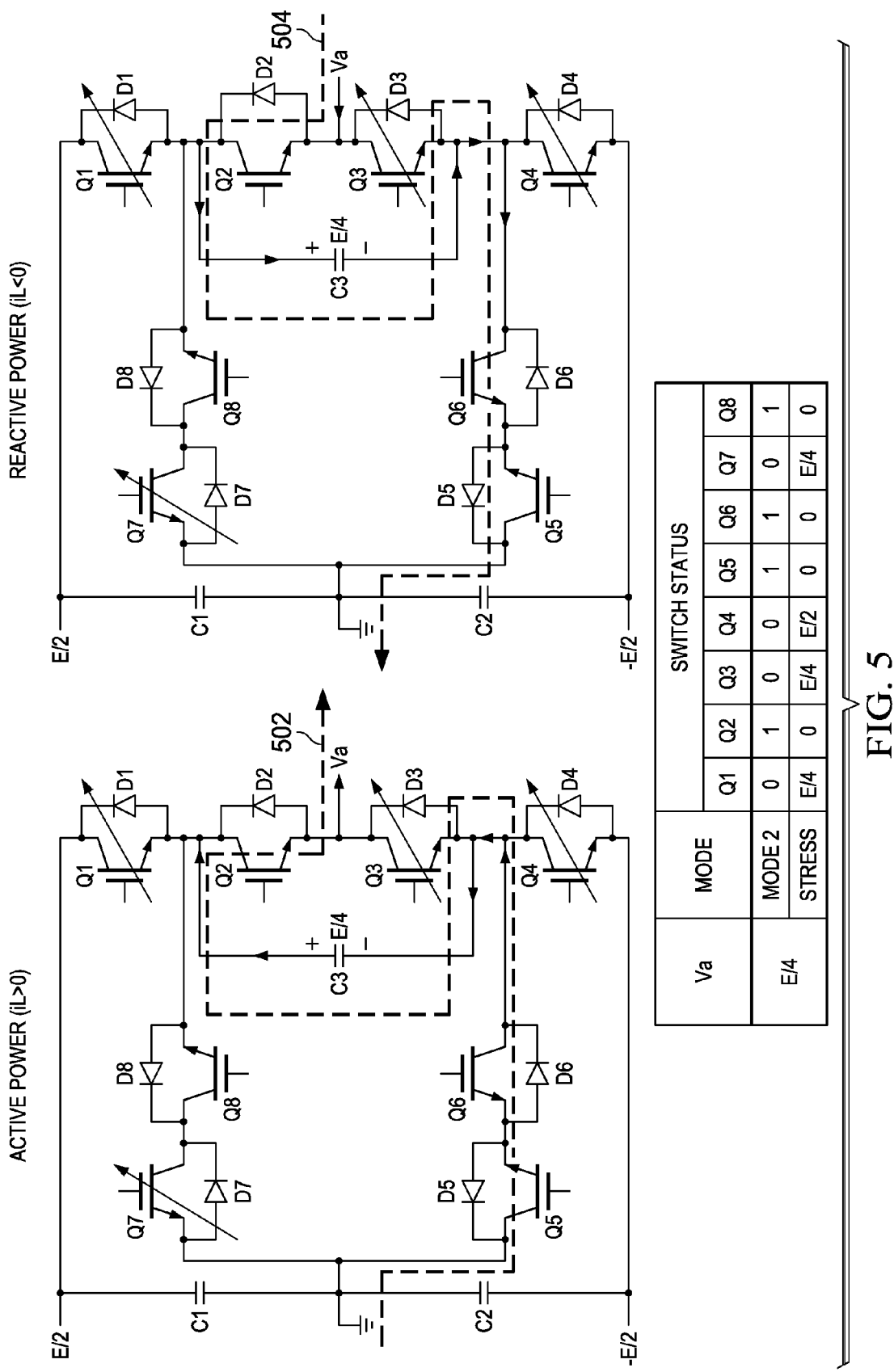
FIG. 5 illustrates the voltage stress of each switch under the second operating mode for producing E/4 at the output of the five-level inverter in accordance with various embodiments of the present disclosure.

FIG. 5 illustrates the voltage stress of each switch under the second operating mode for producing E/4 at the output of the five-level inverter in accordance with various embodiments of the present disclosure. During the phase of active power flowing through the five-level inverter 100, a first conductive path is enabled as indicated by the dashed line 502 shown in FIG. 5. The first conductive path is formed by Q5, D6, C3 and Q2. The current flows from the common node of C1 and C2 to the node Va. Since the voltage across the terminals of C3 is equal to E/4, the output voltage at the node Va is approximately equal to E/4.

During the phase of reactive power flowing through the five-level inverter 100, a second conductive path is enabled as indicated by the dashed line 504 shown in FIG. 5. The second conductive path is formed by D2, C3, Q6 and D5. The current flows from the node Va to the common node of C1 and C2.

During both phases described above, switches Q1, Q3, Q4 and Q7 are turned off as indicated by the arrows placed on top of the symbols of switches Q1, Q3, Q4 and Q7. The voltage stress on the turned-off Q1 is equal to E/4; the voltage stress on the turned-off Q3 is equal to E/4; the voltage stress on the turned-off Q4 is equal to E/2; the voltage stress on the turned-off Q7 is equal to E/4. Switches Q2, Q5, Q6 and Q8 are turned on. It should be noted that while Q8 is turned on, there is no current flowing through the turned-on Q8.

Figure 6:
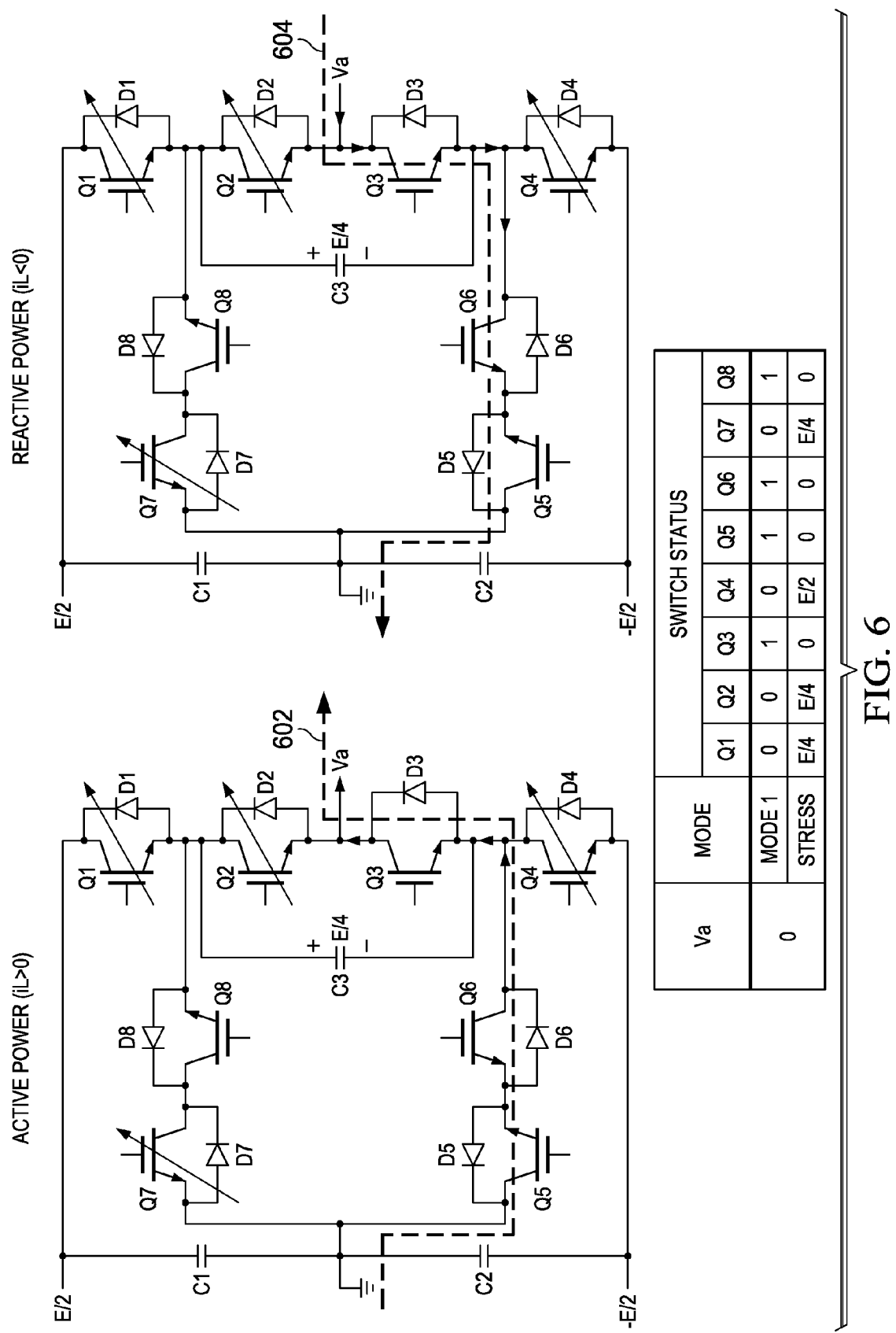
FIG. 6 illustrates the voltage stress of each switch under the first operating mode for producing a zero output voltage in accordance with various embodiments of the present disclosure.

FIG. 6 illustrates the voltage stress of each switch under the first operating mode for producing a zero output voltage in accordance with various embodiments of the present disclosure. During the phase of active power flowing through the five-level inverter 100, a first conductive path is enabled as indicated by the dashed line 602 shown in FIG. 6. The first conductive path is formed by Q5, D6 and D3. The current flows from the common node of C1 and C2 to the node Va. Since the common node of C1 and C2 is connected to ground, the output voltage at the node Va is approximately equal to zero.

During the phase of reactive power flowing through the five-level inverter 100, a second conductive path is enabled as indicated by the dashed line 604 shown in FIG. 6. The second conductive path is formed by Q3, Q6 and D5. The current flows from the node Va to the common node of C1 and C2.

During both phases described above, switches Q1, Q2, Q4 and Q7 are turned off as indicated by the arrows placed on top of the symbols of switches Q1, Q2, Q4 and Q7. The voltage stress on the turned-off Q1 is equal to E/4; the voltage stress on the turned-off Q2 is equal to E/4; the voltage stress on the turned-off Q4 is equal to E/2; the voltage stress on the turned-off Q7 is equal to E/4. Switches Q3, Q5, Q6 and Q8 are turned on. It should be noted that while Q8 is turned on, there is no current flowing through the turned-on Q8.

Figure 7:
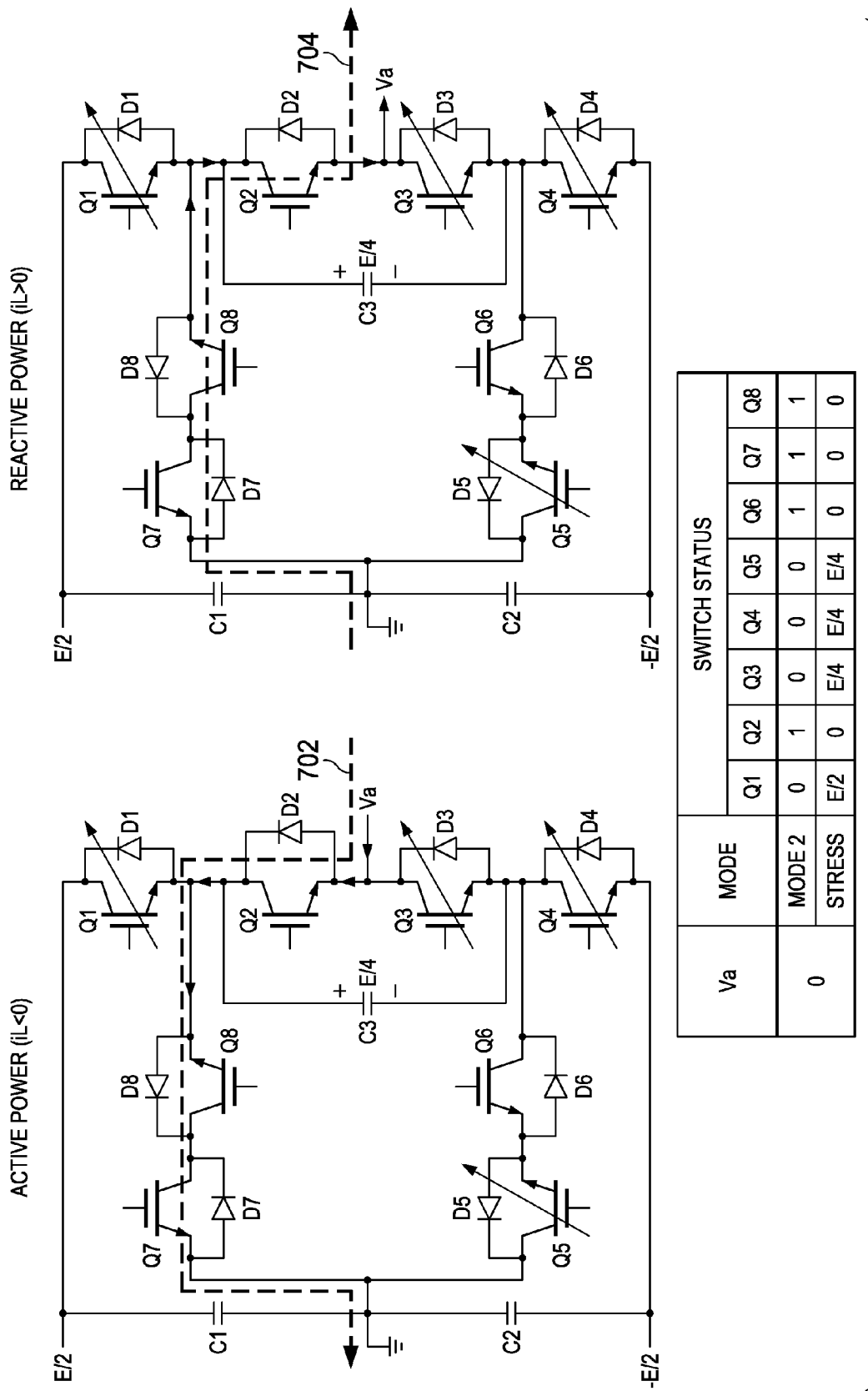
FIG. 7 illustrates the voltage stress of each switch under the second operating mode for producing a zero output voltage in accordance with various embodiments of the present disclosure.

FIG. 7 illustrates the voltage stress of each switch under the second operating mode for producing a zero output voltage in accordance with various embodiments of the present disclosure. During the phase of active power flowing through the five-level inverter, a first conductive path is enabled as indicated by the dashed line 702 shown in FIG. 7. The first conductive path is formed by D2, D8 and Q7. The current flows from the node Va to the common node of C1 and C2. Since the common node of C1 and C2 is connected to ground, the output voltage at the node Va is approximately equal to zero.

During the phase of reactive power flowing through the five-level inverter 100, a second conductive path is enabled as indicated by the dashed line 704 shown in FIG. 7. The second conductive path is formed by D7, Q8 and Q2. The current flows from the common node of C1 and C2 to the node Va.

During both phases described above, switches Q1, Q3 Q4 and Q5 are turned off as indicated by the arrows placed on top of the symbols of switches Q1, Q3, Q4 and Q5. The voltage stress on the turned-off Q1 is equal to E/2; the voltage stress on the turned-off Q3 is equal to E/4; the voltage stress on the turned-off Q4 is equal to E/4; the voltage stress on the turned-off Q5 is equal to E/4. Switches Q2, Q6, Q7 and Q8 are turned on. It should be noted that while Q6 is turned on, there is no current flowing through the turned-on Q6.

Figure 8:
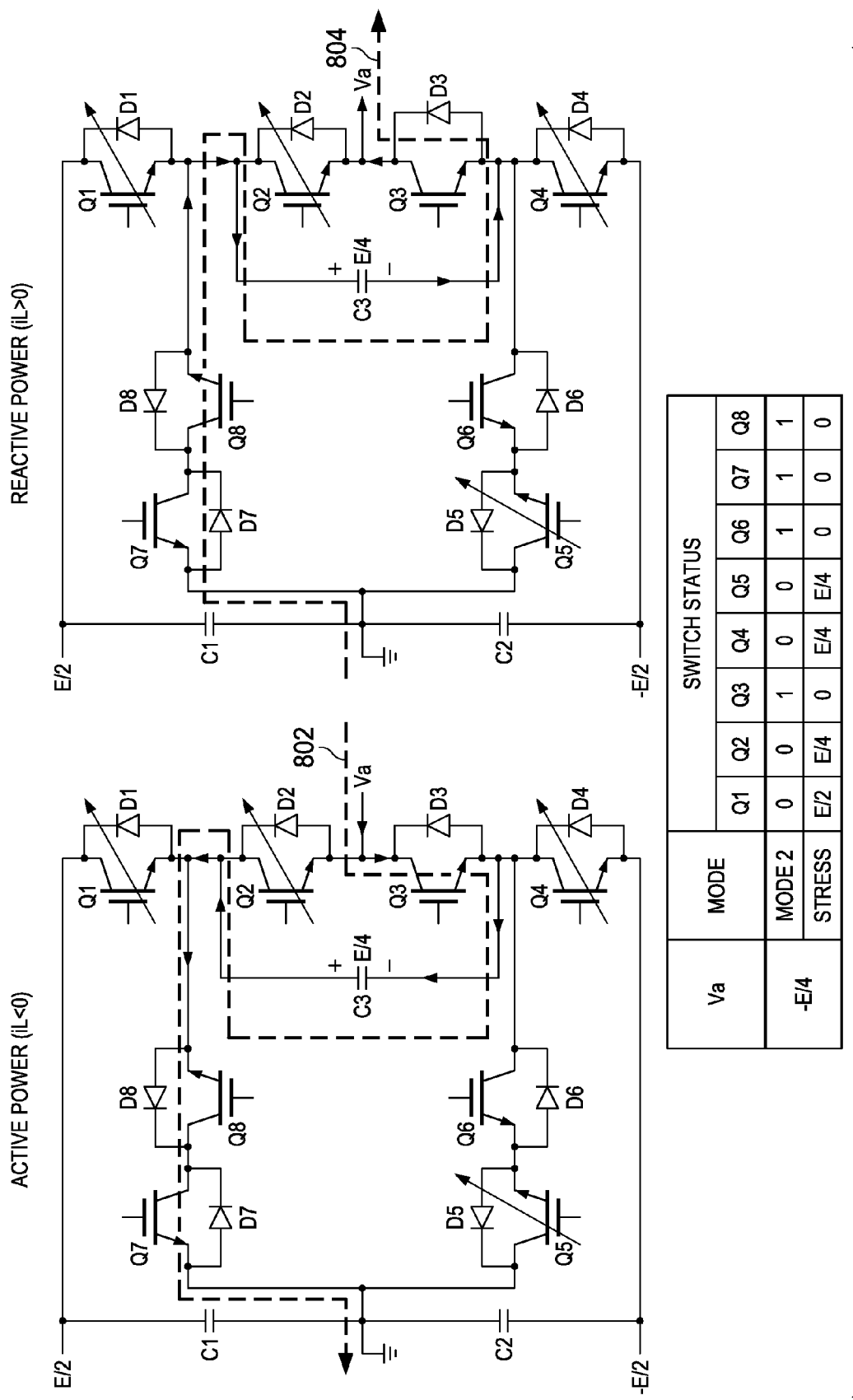
FIG. 8 illustrates the voltage stress of each switch under the second operating mode for producing -E/4 at the output of the five-level inverter in accordance with various embodiments of the present disclosure.

FIG. 8 illustrates the voltage stress of each switch under the second operating mode for producing −E/4 at the output of the five-level inverter in accordance with various embodiments of the present disclosure. During the phase of active power flowing through the five-level inverter 100, a first conductive path is enabled as indicated by the dashed line 802 shown in FIG. 8. The first conductive path is formed by Q3, C3, D8 and Q7. The current flows from the node Va to the common node of C1 and C2. Since the common node of C1 and C2 is connected to ground, and the voltage across the terminals of C3 is equal to E/4, the output voltage at the node Va is equal to −E/4.

During the phase of reactive power flowing through the five-level inverter, a second conductive path is enabled as indicated by the dashed line 804 shown in FIG. 8. The second conductive path is formed by D7, Q8, C3 and D3. The current flows from the common node of C1 and C2 to the node Va.

During both phases described above, switches Q1, Q2, Q4 and Q5 are turned off as indicated by the arrows placed on top of the symbols of Q1, Q2, Q4 and Q5. The voltage stress on the turned-off Q1 is equal to E/2; the voltage stress on the turned-off Q2 is equal to E/4; the voltage stress on the turned-off Q4 is equal to E/4; the voltage stress on the turned-off Q5 is equal to E/4. Switches Q3, Q6, Q7 and Q8 are turned on. It should be noted that while Q6 is turned on, there is no current flowing through the turned-on Q6.

Figure 9:
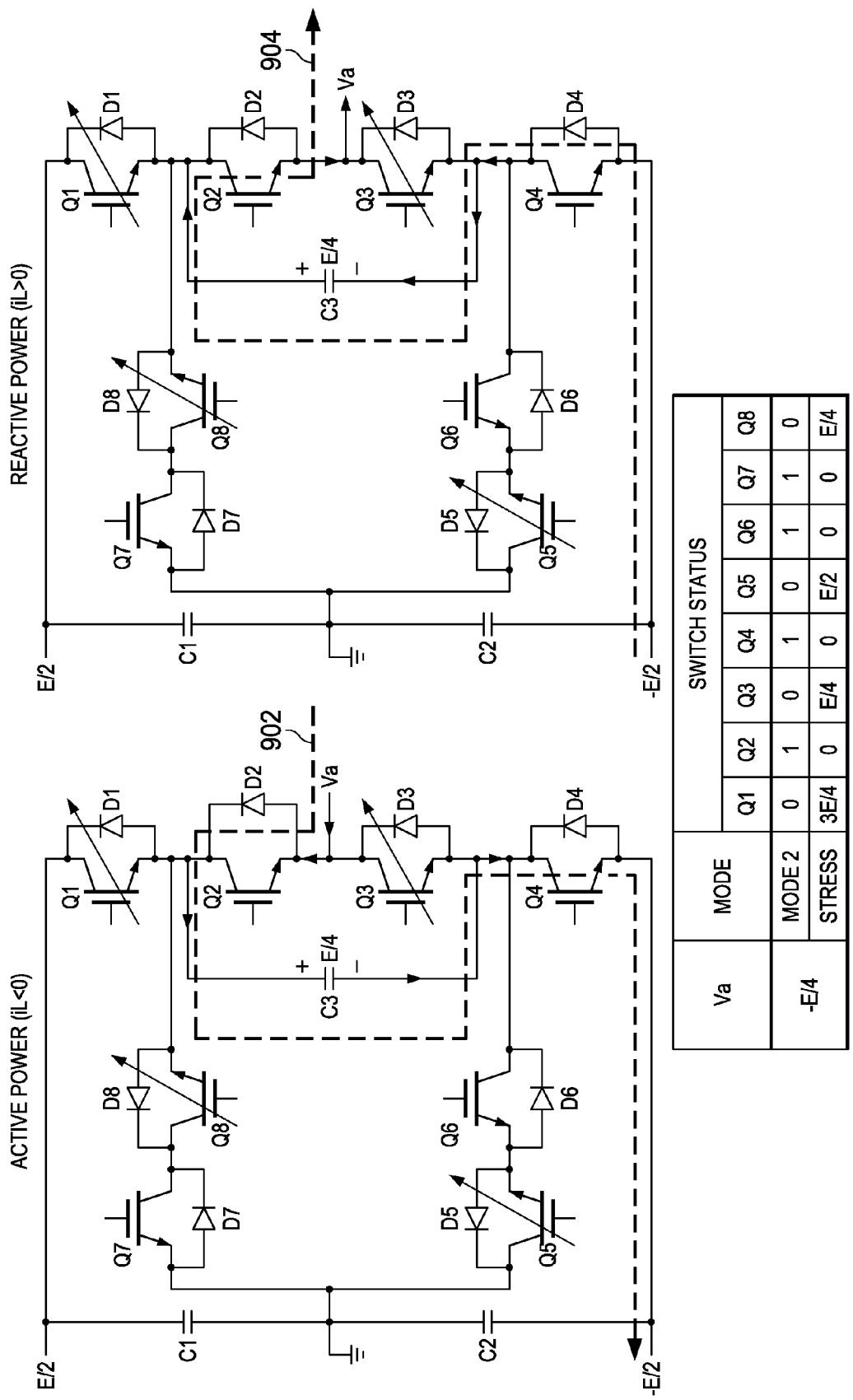
FIG. 9 illustrates the voltage stress of each switch under the first operating mode for producing -E/4 at the output of the five-level inverter in accordance with various embodiments of the present disclosure.

FIG. 9 illustrates the voltage stress of each switch under the first operating mode for producing −E/4 at the output of the five-level inverter in accordance with various embodiments of the present disclosure. During the phase of active power flowing through the five-level inverter 100, a first conductive path is enabled as indicated by the dashed line 902 shown in FIG. 9. The first conductive path is formed by D2, C3 and Q4. The current flows from the node Va to the negative terminal of C2. Since the voltage at the negative terminal of C2 is equal to −E/2, and the voltage across C3 is equal to E/4, the output voltage at the node Va is approximately equal to −E/4.

During the phase of reactive power flowing through the five-level inverter 100, a second conductive path is enabled as indicated by the dashed line 904 shown in FIG. 9. The second conductive path is formed by D4, C3 and Q2. The current flows from the negative terminal of C2 to the node Va.

During both phases described above, switches Q1, Q3, Q5 and Q8 are turned off as indicated by the arrows placed on top of the symbols of switches Q1, Q3, Q5 and Q8. The voltage stress on the turned-off Q1 is equal to 3E/4; the voltage stress on the turned-off Q3 is equal to E/4; the voltage stress on the turned-off Q5 is equal to E/2; the voltage stress on the turned-off Q8 is equal to E/4. Switches Q2, Q4, Q6 and Q7 are turned on. It should be noted that while switches Q6 and Q7 are turned on, there are no currents flowing through the turned-on Q6 and Q7.

Figure 10:
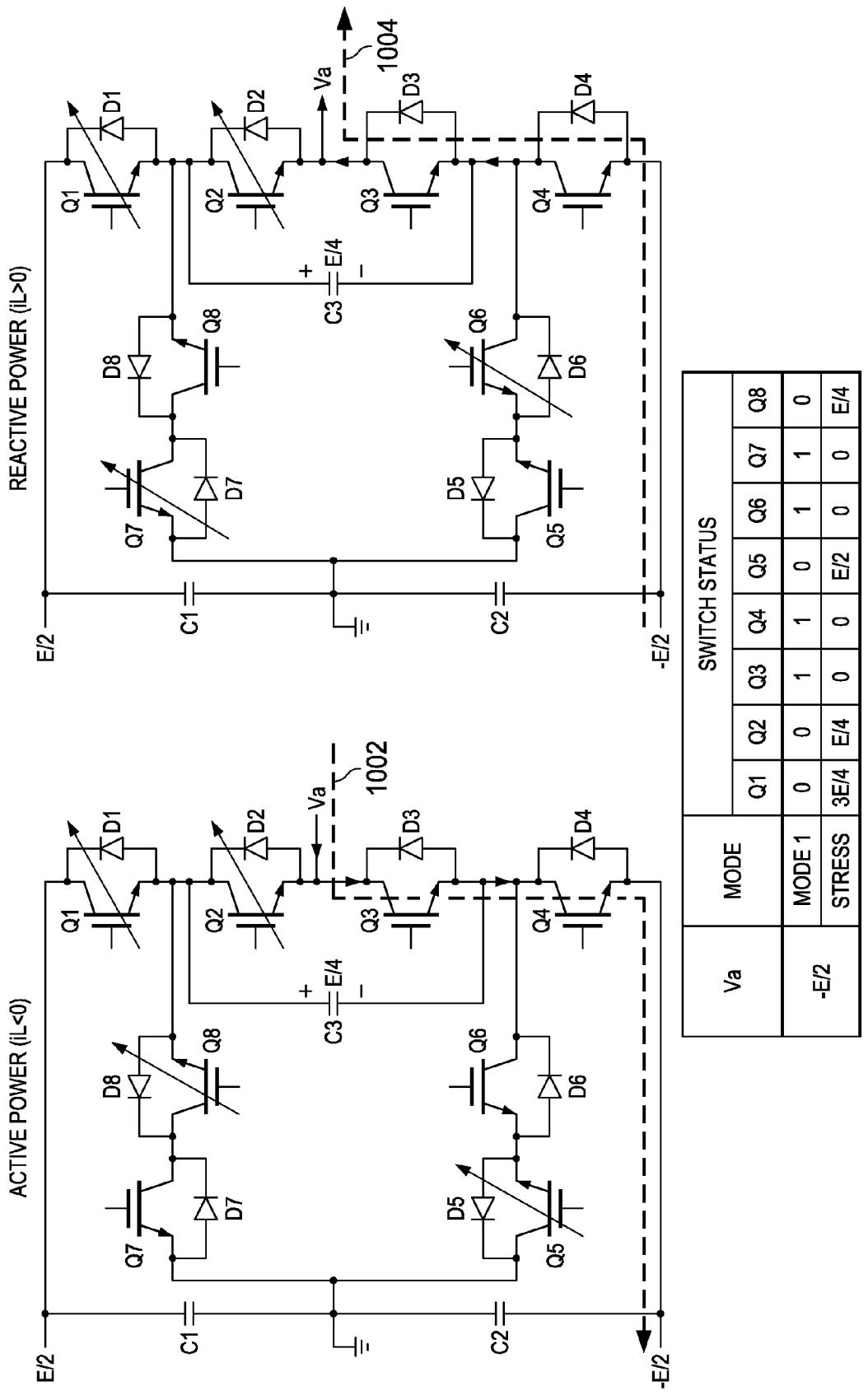
FIG. 10 illustrates the voltage stress of each switch under the operating mode for producing -E/2 at the output of the five-level inverter in accordance with various embodiments of the present disclosure.

FIG. 10 illustrates the voltage stress of each switch under the operating mode for producing −E/2 at the output of the five-level inverter in accordance with various embodiments of the present disclosure. During the phase of active power flowing through the five-level inverter 100, a first conductive path is enabled as indicated by the dashed line 1002 shown in FIG. 10. The first conductive path is formed by Q3 and Q4. The current flows from the node Va to the negative terminal of C2. Since the voltage at the negative terminal of C2 is equal to −E/2, the output voltage at Vo is approximately equal to −E/2.

During the phase of reactive power flowing through the five-level inverter 100, a second conductive path is enabled as indicated by the dashed line 1004 shown in FIG. 10. The second conductive path is formed by D4 and D3. The current flows from the negative terminal of C2 to the node Va.

During both phases described above, switches Q1, Q2, Q5 and Q8 are turned off as indicated by the arrows placed on top of the symbols of switches Q1, Q2, Q5 and Q8. The voltage stress on the turned-off Q1 is equal to 3E/4; the voltage stress on the turned-off Q2 is equal to E/4; the voltage stress on the turned-off Q5 is equal to E/2; the voltage stress on the turned-off Q8 is equal to E/4. Switches Q3, Q4, Q6 and Q7 are turned on. It should be noted that while switches Q5 and Q8 are turned on, there may be no currents flowing through the turned-on Q5 and Q8.

FIG. 11 illustrates a table including the voltage stresses of all switches under eight operating modes of the five-level inverter in accordance with various embodiments of the present disclosure. As shown in FIG. 11, switches Q1 and Q4's highest voltage stress is equal to 3E/4, wherein E is the output voltage of the input dc power source. Switches Q5 and Q7's highest voltage stress is equal to E/2. Switches Q2, Q3, Q6 and Q8's highest voltage stress is equal to E/4.

In some embodiments, the output voltage of the input dc power source E is equal to 1500 V. As a result, the highest voltage across switches Q1 and Q4 is about 1125 V; the highest voltage across switches Q5 and Q7 is about 750 V; the highest voltage across switches Q2, Q3, Q6 and Q8 is about 375 V. As such, Q2, Q3, Q6 and Q6 may be implemented as 600 V IGBTs; Q1, Q4, Q5 and Q7 may be implemented as 1200 V IGBTs.

Figure 12:
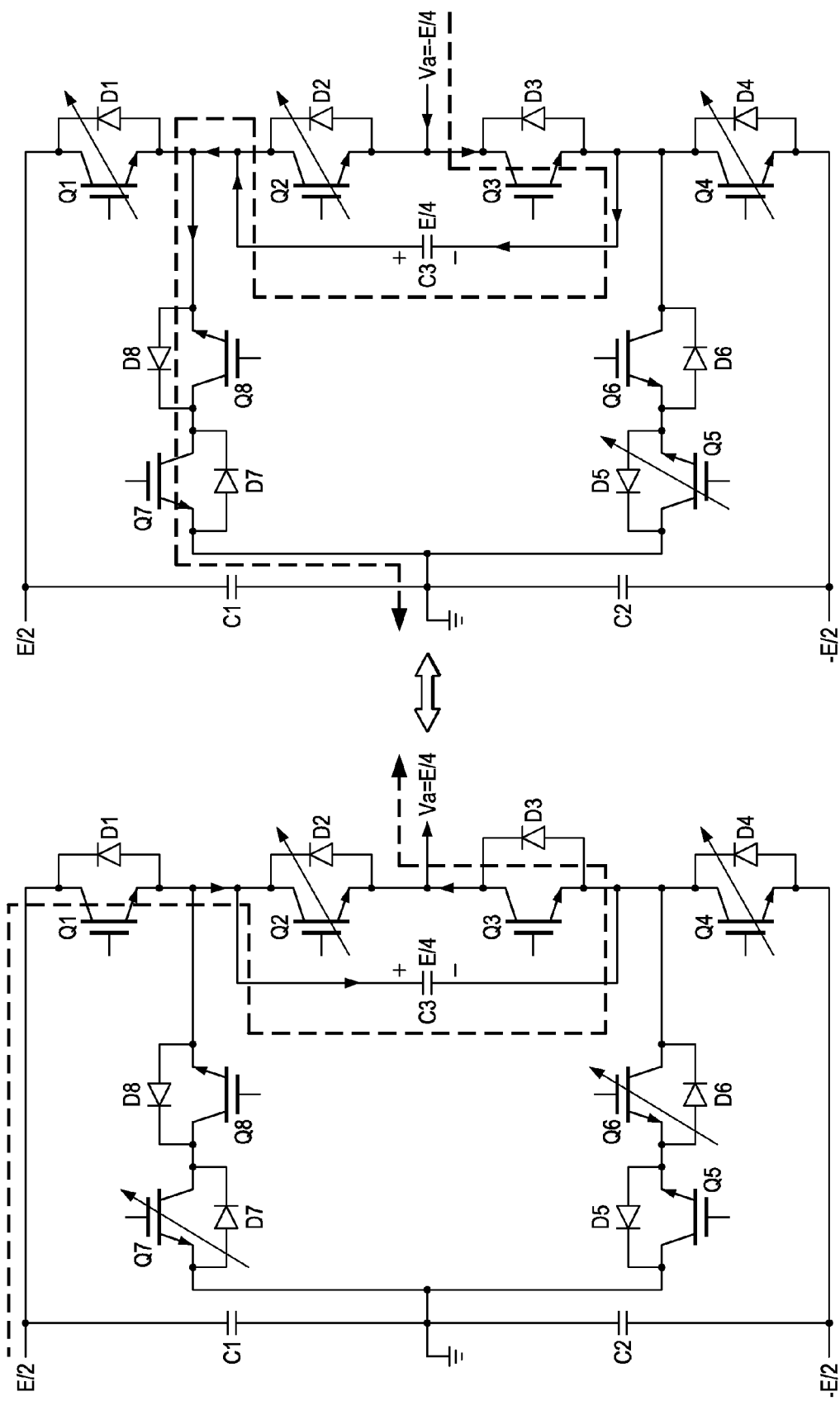
FIG. 12 illustrates a first modulation scheme for charging and discharging the flying capacitor of the five-level inverter in accordance with various embodiments of the present disclosure.

FIG. 12 illustrates a first modulation scheme for charging and discharging the flying capacitor of the five-level inverter in accordance with various embodiments of the present disclosure. As described above with respect to FIGS. 4-5 and FIGS. 8-9, the flying capacitor C3 is charged or discharged when the output voltage of the five-level inverter 100 is equal to E/4 or −E/4. In order to balance the charge across the flying capacitor C3, the first operating mode for producing E/4 may be employed in the positive half cycle to charge the flying capacitor C3 and the second operating mode for producing −E/4 may be employed in the negative half cycle to discharge the flying capacitor C3.

As shown in FIG. 12, in the positive half cycle, the current flows from the positive terminal of the capacitor C1 to the node Va through a conductive path formed by Q1, C3 and D3. As a result, the flying capacitor C3 is charged. In the negative half cycle, the current flows from the node Va to the common node of C1 and C2 through a conductive path formed by Q3, C3, D8 and Q7. As a result, the flying capacitor C3 is discharged. By employing the modulation scheme shown in FIG. 12, the average current flowing through the flying capacitor C3 is equal to zero. As a result, the flying capacitor C3 is able to maintain charge balance.

FIG. 13 illustrates switch on/off statuses under the modulation scheme shown in FIG. 12 in accordance with various embodiments of the present disclosure. There are two operating modes for producing E/4 according to FIGS. 4-5. By employing the modulation scheme shown in FIG. 12, only the first operating mode for producing E/4 is employed in the positive half cycle as shown in the table of FIG. 12. Likewise, there are two operating modes for producing −E/4 according to FIGS. 8-9. By employing the modulation scheme shown in FIG. 12, only the second operating mode for producing −E/4 is employed in the negative half cycle as shown in the table of FIG. 12.

As shown in FIG. 13, switches Q1 and Q6 are controlled by a pair of control signals complementary to each other. Likewise, switches Q2 and Q3 are controlled by a pair of control signals complementary to each other. Switches Q4 and Q8 are controlled by a pair of control signals complementary to each other. Switches Q5 and Q7 are controlled by a pair of control signals complementary to each other.

Figure 14:
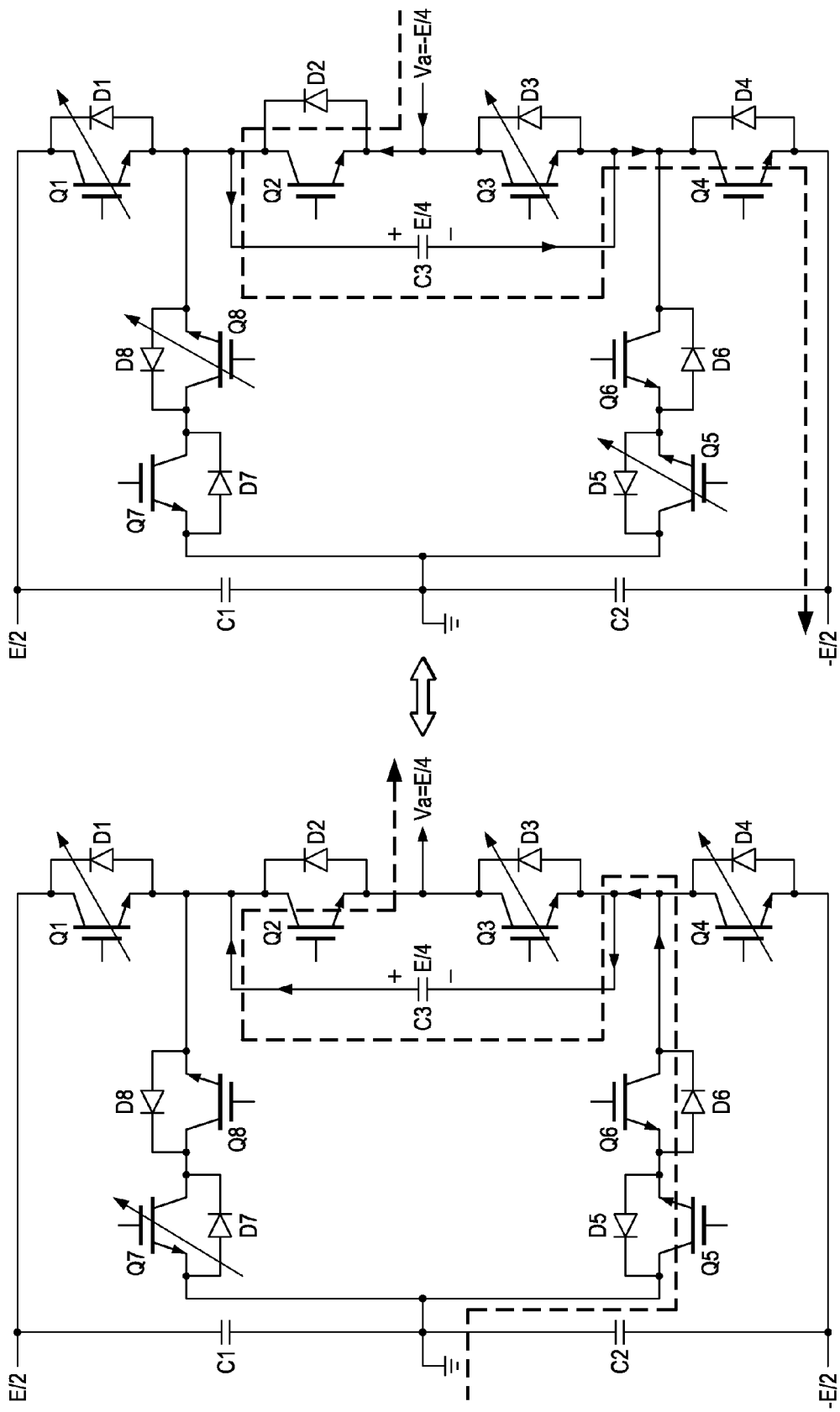
FIG. 14 illustrates a second modulation scheme for charging and discharging the flying capacitor of the five-level inverter in accordance with various embodiments of the present disclosure.

FIG. 14 illustrates a second modulation scheme for charging and discharging the flying capacitor of the five-level inverter in accordance with various embodiments of the present disclosure. The modulation scheme shown in FIG. 14 is similar to that shown in FIG. 12 except that the second operating mode for producing E/4 may be employed in the positive half cycle to discharge the flying capacitor C3 and the first operating mode for producing −E/4 may be employed in the negative half cycle to charge the flying capacitor C3.

As shown in FIG. 14, in the positive half cycle, the current flows from the common node of C1 and C2 to the node Va through a conductive path formed by Q5, D6, C3 and Q2. As a result, the flying capacitor C3 is discharged. In the negative half cycle, the current flows from the node Va to the negative terminal of the capacitor C2 through a conductive path formed by D2, C3 and Q4. As a result, the flying capacitor C3 is charged. By employing the modulation scheme shown in FIG. 14, the average current flowing through the flying capacitor C3 is equal to zero. As a result, the flying capacitor C3 is able to maintain charge balance.

FIG. 15 illustrates switch on/off statuses under the modulation scheme shown in FIG. 14 in accordance with various embodiments of the present disclosure. By employing the modulation scheme shown in FIG. 14, only the second operating mode for producing E/4 is employed in the positive half cycle as shown in the table of FIG. 15. Likewise, only the first operating mode for producing −E/4 is employed in the negative half cycle as shown in the table of FIG. 15.

As shown in FIG. 15, switches Q1 and Q6 are controlled by a pair of control signals complementary to each other. Likewise, switches Q2 and Q3 are controlled by a pair of control signals complementary to each other. Switches Q4 and Q8 are controlled by a pair of control signals complementary to each other. Switches Q5 and Q7 are controlled by a pair of control signals complementary to each other.

Figure 16:
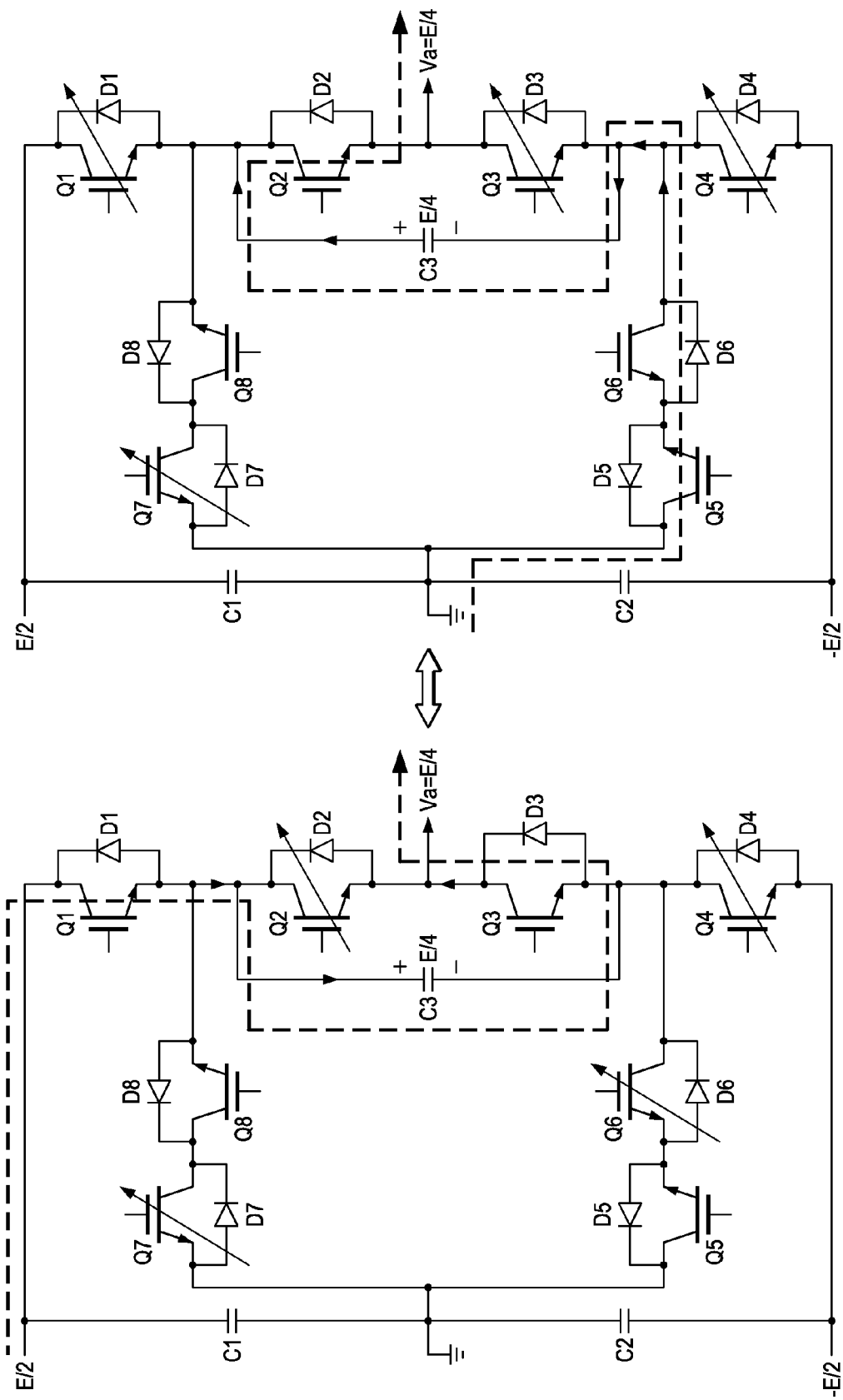
FIG. 16 illustrates a positive half-cycle of a third modulation scheme for charging and discharging the flying capacitor of the five-level inverter in accordance with various embodiments of the present disclosure.

FIG. 16 illustrates a positive half-cycle of a third modulation scheme for charging and discharging the flying capacitor of the five-level inverter in accordance with various embodiments of the present disclosure. As described above with respect to FIGS. 4-5 and FIGS. 8-9, the flying capacitor C3 is charged or discharged when the output voltage of the five-level inverter is equal to E/4 or −E/4. In order to reduce the voltage ripple on the flying capacitor C3, both the first operating mode and the second operating mode for producing E/4 may be employed in the positive half cycle.

As shown in FIG. 16, in the positive half cycle, when the first operating mode for producing E/4 is employed, the current flows from the positive terminal of the capacitor C1 to the node Va through a conductive path formed by Q1, C3 and D3. As a result, the flying capacitor C3 is charged. On the other hand, when the second operating mode for producing E/4 is employed in the positive half cycle, the current flows from the common node of C1 and C2 to the node Va through a conductive path formed by Q5, D6, C3 and Q2. As a result, the flying capacitor C3 is discharged.

One advantageous feature of having the modulation scheme shown in FIG. 16 is the flying capacitor is charged and discharged within the positive half cycle of the five-level inverter 100. As a result, the ripple on the flying capacitor C3 is reduced.

Figure 17:
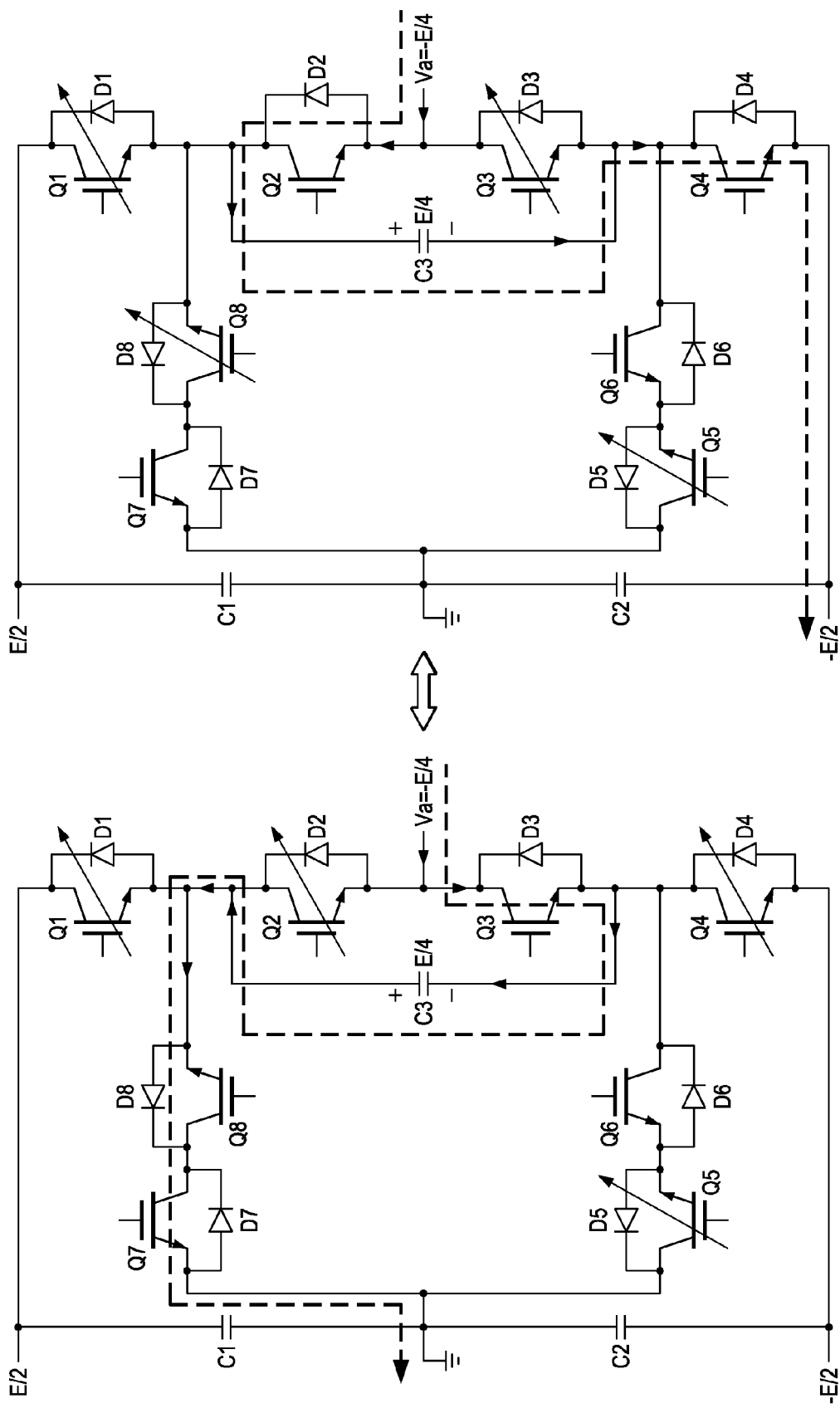
FIG. 17 illustrates a negative half-cycle of the third modulation scheme for charging and discharging the flying capacitor of the five-level inverter in accordance with various embodiments of the present disclosure.

FIG. 17 illustrates a negative half-cycle of the third modulation scheme for charging and discharging the flying capacitor of the five-level inverter in accordance with various embodiments of the present disclosure. Similar to the modulation scheme shown in FIG. 16, in order to reduce the voltage ripple on the flying capacitor C3, both the first operating mode and the second operating mode for producing −E/4 may be employed in the negative half cycle.

As shown in FIG. 17, in the negative half cycle, when the second operating mode for producing −E/4 is employed, the current flows from the node Va to the common node of C1 and C2 through a conductive path formed by Q3, C3, D8 and Q7. As a result, the flying capacitor C3 is discharged. On the other hand, when the first operating mode for producing −E/4 is employed in the negative half cycle, the current flows from the node Va to the negative terminal of the capacitor C2 through a conductive path formed by D2, C3 and Q4. As a result, the flying capacitor C3 is charged.

One advantageous feature of having the modulation scheme shown in FIG. 17 is the flying capacitor is charged and discharged within the negative half cycle. As a result, the ripple on the flying capacitor C3 is reduced.

FIG. 18 illustrates switch on/off statuses under the modulation scheme shown in FIGS. 16-17 in accordance with various embodiments of the present disclosure. There are two operating modes for producing E/4 according to FIGS. 4-5. By employing the modulation scheme shown in FIG. 16, both the first operating mode and the second operating mode for producing E/4 are employed in the positive half cycle as shown in the table of FIG. 18. Likewise, there are two operating modes for producing −E/4 according to FIGS. 8-9. By employing the modulation scheme shown in FIG. 17, both the first operating mode and the second operating mode for producing −E/4 are employed in the negative half cycle as shown in the table of FIG. 18.

As shown in FIG. 18, switches Q1 and Q6 are controlled by a pair of control signals complementary to each other. Likewise, switches Q2 and Q3 are controlled by a pair of control signals complementary to each other. Switches Q4 and Q8 are controlled by a pair of control signals complementary to each other. Switches Q5 and Q7 are controlled by a pair of control signals complementary to each other.

Figure 19:
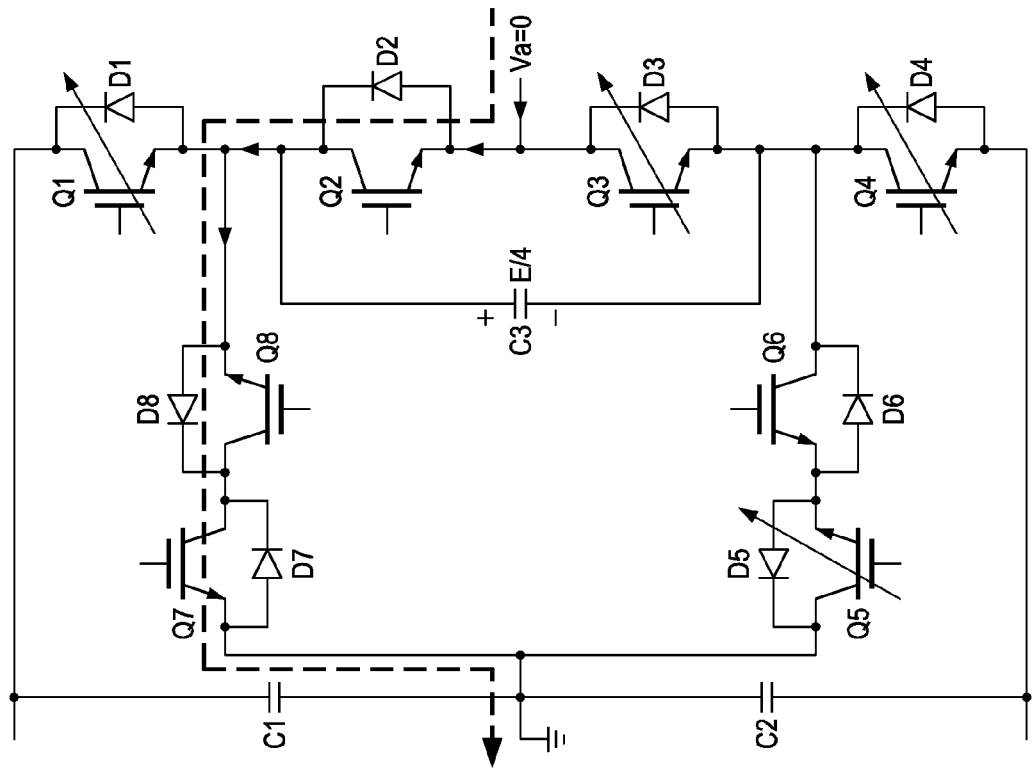
FIG. 19 illustrates a modulation scheme for charging and discharging the common node of the input capacitors in accordance with various embodiments of the present disclosure.
Figure 19:
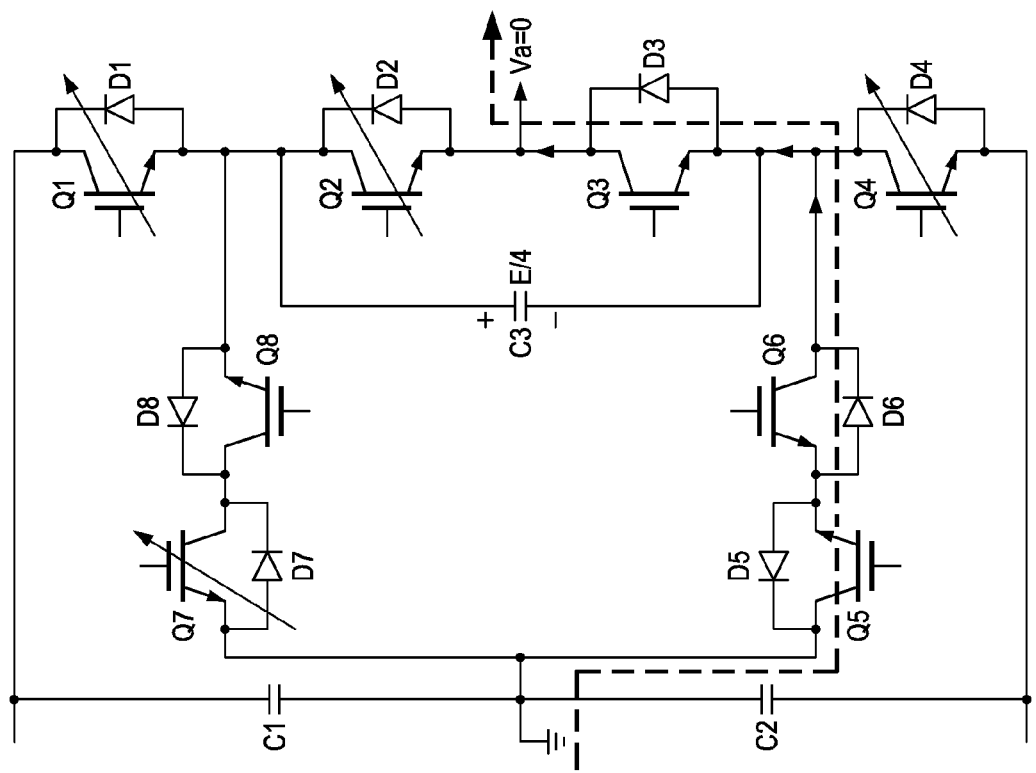

FIG. 19 illustrates a modulation scheme for charging and discharging the common node of the input capacitors in accordance with various embodiments of the present disclosure. As described above with respect to FIGS. 6-7, the common node of C1 and C2 is charged or discharged when the node Va of the five-level inverter 100 is equal to zero. As shown in FIG. 19, in the positive half cycle, the current flows from the common node of C1 and C2 to the node Va through a conductive path formed by Q5, D6 and D3. As a result, the common node of C1 and C2 is discharged. In the negative half cycle, the current flows from the node Va to the common node of C1 and C2 through a conductive path formed by D2, D8 and Q7. As a result, the common node of C1 and C2 is charged.

Figure 20:
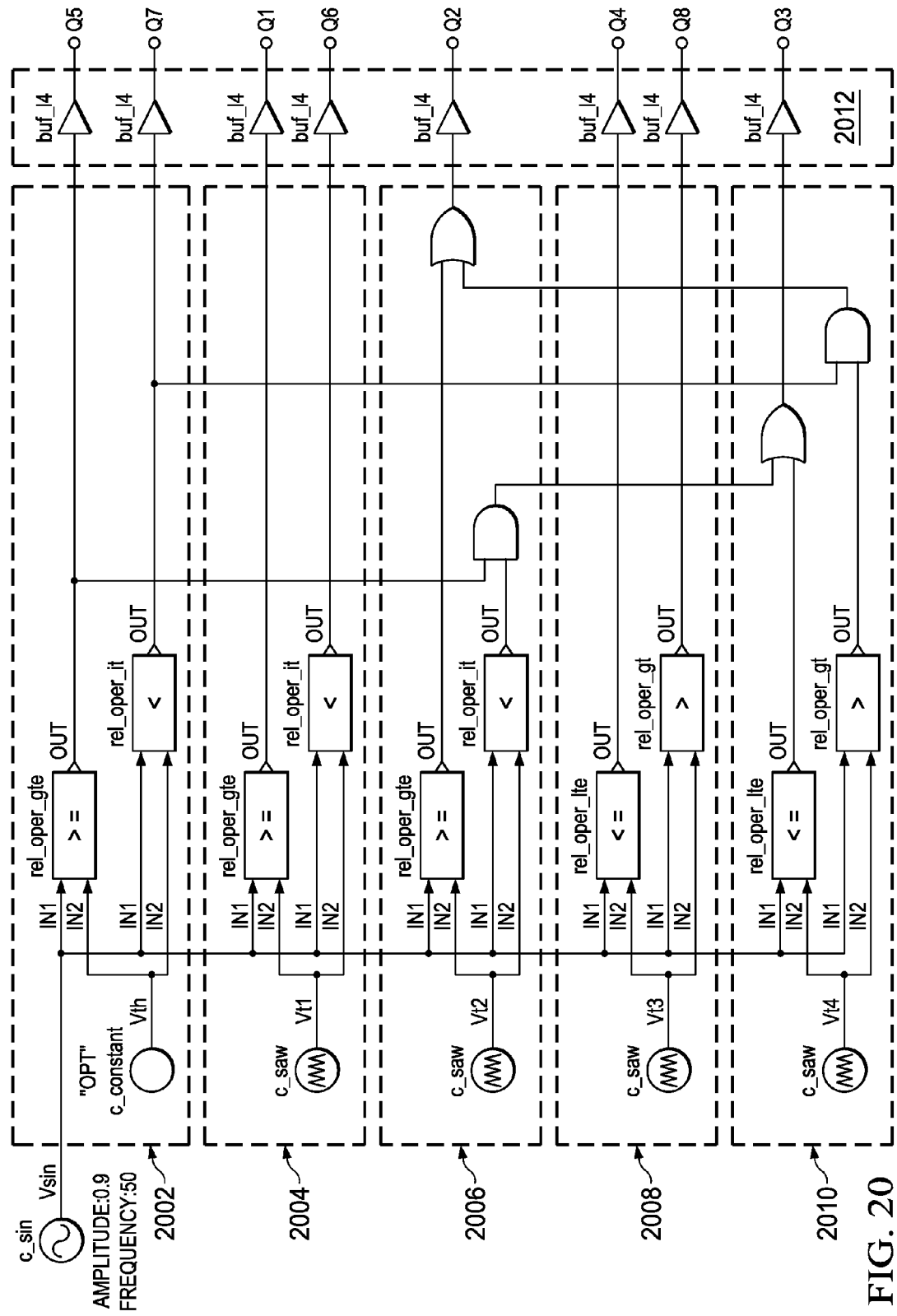
FIG. 20 illustrates a schematic diagram of a gate control signal generator for the five-level inverter shown in FIG. 1 in accordance with various embodiments of the present disclosure.

FIG. 20 illustrates a schematic diagram of a gate control signal generator for the five-level inverter shown in FIG. 1 in accordance with various embodiments of the present disclosure. In some embodiments, switches Q1 and Q6 are controlled by a pair of control signals complementary to each other; switches Q2 and Q3 are controlled by a pair of control signals complementary to each other; switches Q4 and Q8 are controlled by a pair of control signals complementary to each other; switches Q5 and Q7 are controlled by a pair of control signals complementary to each other.

In the positive half cycle, Q5 is always on; Q7 is always off. In the negative half cycle, Q5 is always off; Q7 is always on. The circuit block 2002 shown in FIG. 20 is used to generate the signals for controlling Q5 and Q7. It should be noted that the circuit block 2002 is merely an example, which should not unduly limit the scope of the claims. One of ordinary skill in the art would recognize many variations, alternatives, and modifications.

Switches Q1 and Q4 are controlled by a first PWM scheme. Switches Q2 and Q3 are controlled by a second PWM scheme. In some embodiments, the first PWM scheme is a carrier phase opposition disposition PWM control scheme. The second PWM scheme is a carrier phase shift PWM scheme. Both the carrier phase opposition disposition PWM control scheme and the carrier phase shift PWM scheme are well known in the art, and hence are not discussed herein to avoid repetition.

In the positive half cycle, Q1 and Q2 are controlled under the carrier phase opposition disposition PWM control scheme and the carrier phase shift PWM scheme respectively. The control signal of Q3 is complementary to the control signal of Q2 in the positive half cycle. The control signal of Q6 is complementary to the control signal of Q1 in the positive half cycle.

In the negative half cycle, Q4 and Q3 are controlled under the carrier phase opposition disposition PWM control scheme and the carrier phase shift PWM scheme respectively. The control signal of Q2 is complementary to the control signal of Q3 in the negative half cycle. The control signal of Q8 is complementary to the control signal of Q4 in the negative half cycle.

The circuit block 2004 shown in FIG. 20 is used to generate the signals for controlling Q1 and Q6. The circuit blocks 2006 and 2010 shown in FIG. 20 are used to generate the signals for controlling Q2 and Q3. The circuit block 2008 shown in FIG. 20 is used to generate the signals for controlling Q4 and Q8. The circuit block 2012 comprises a plurality of buffers. The buffers of the circuit block 2012 are employed to adjust the dead time between two control signals complementary to each other.

Figure 21:
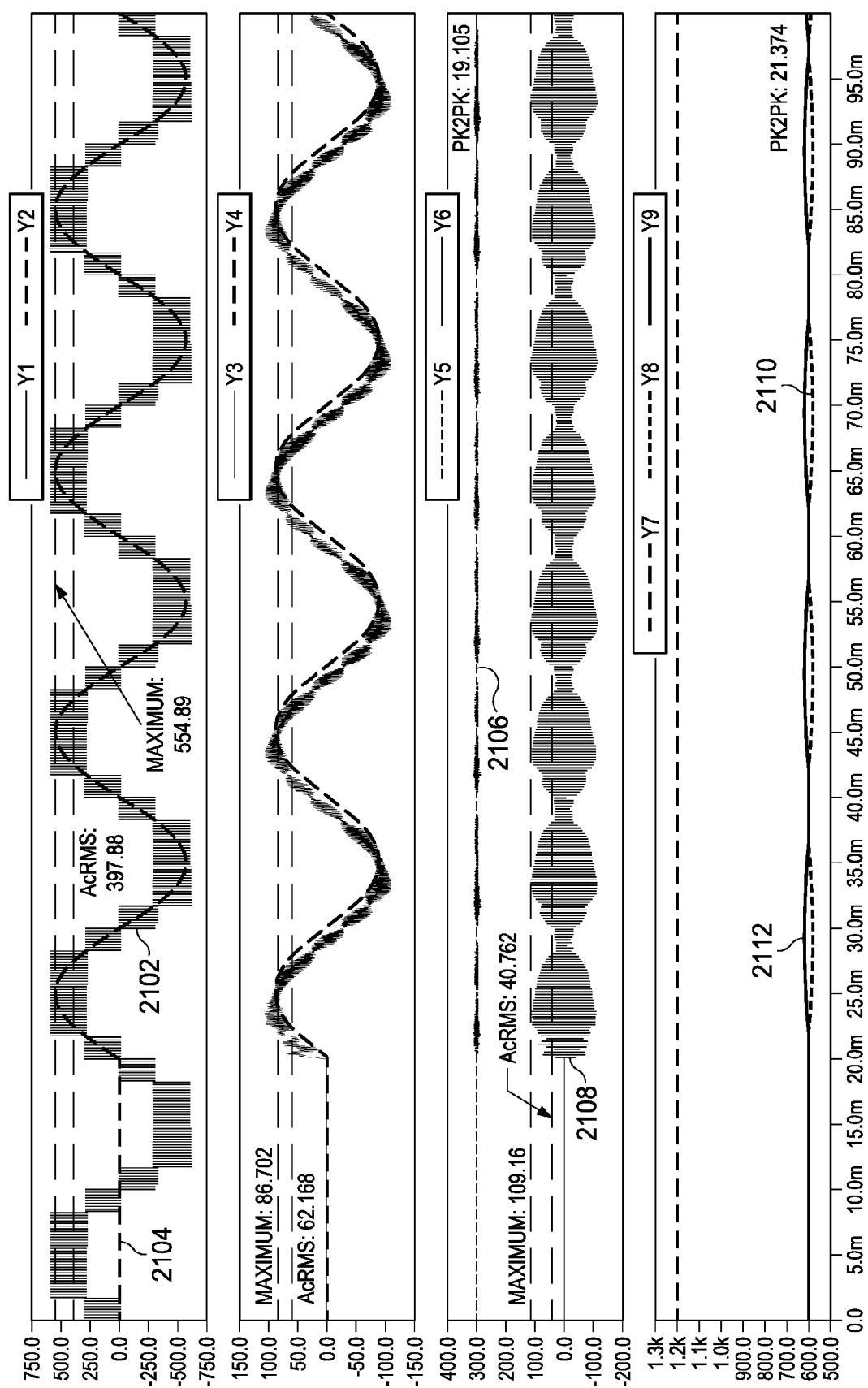
FIG. 21 illustrates various waveforms of the five-level inverter shown in FIG. 1 in accordance with various embodiments of the present disclosure.

FIG. 21 illustrates various waveforms of the five-level inverter shown in FIG. 1 in accordance with various embodiments of the present disclosure. The waveforms shown in FIG. 21 are based upon a five-level inverter system. The five-level inverter system has an inverter structure similar to that shown in FIG. 1. The single phase power of the five-level inverter system is 25 kW. The single phase root-mean-square (RMS) voltage is 400 Vac. The single phase peak voltage is 566 V. The single phase RMS current is 62.5 A. The single phase peak current is 90 A. The input dc power source's output voltage is equal to 1200 V. The switching frequency of the five-level inverter system is 10 kHz. The first input capacitor's capacitance is 5 mF. The second input capacitor's capacitance is 5 mF. The flying capacitor's capacitance is 200 uF. The inductance of the L-C filter is 100 uH. The capacitance of the L-C filter is 150 uF. The load RL is equal to 6.4Ω.

The horizontal axis of FIG. 21 represents intervals of time. The unit of the horizontal axis is millisecond. There may be nine vertical axes. The first vertical axis Y1 represents the voltage at the node Va. The second vertical axis Y2 represents the voltage at the node Vo. The third vertical axis Y3 represents the current flowing through the inductor Lo of the five-level inverter 100 shown in FIG. 1. The fourth vertical axis Y4 represents the current flowing through the load RL. The fifth vertical axis Y5 represents the voltage across the flying capacitor C3. The sixth vertical axis Y6 represents the current flowing through the flying capacitor C3. The seventh vertical axis Y7 represents the voltage from the input dc power source E. The eighth vertical axis Y8 represents the voltage across the first input capacitor C1. The ninth vertical axis Y9 represents the voltage across the second input capacitor C2.

Waveform 2102 shows the voltage at the node Va is a staircase waveform and symmetrical at the 180° axis. In other words, the waveform of the negative half cycle is merely inverted from that of the positive half cycle with the same spacing. Furthermore, in a half cycle (e.g., the positive half cycle), the voltage at the node Va is symmetrical about the 90° axis. Waveform 2104 is the voltage waveform at the output of the output L-C filter 110 shown in FIG. 1. As shown in FIG. 21, the L-C filter helps to filter the five-level PWM voltage at the node Va to obtain a sinusoidal waveform at the node Vo.

Waveform 2106 shows the peak-to-peak ripple voltage on the flying capacitor C3 is about 20 V. Waveform 2109 shows the peak ripple current flowing through the flying capacitor C3 is about 110 A and the RMS value of the current flowing through the flying capacitor C3 is about 41 A. Waveforms 2110 and 2112 show the peak-to-peak ripple voltage at the input capacitors C1 and C2 is about 22 V.

One advantageous feature of having a multilevel inverter such as a five-level inverter shown in FIG. 1 is that the staircase waveform (e.g., waveform 2102) shown in FIG. 21 resembles a sinusoidal waveform. Therefore, the five-level inverter 100 may generate an ac waveform with low distortion. The low distortion helps to achieve a low THD for the five-level inverter 100. Such a low THD helps to reduce the size of the output L-C filter 110.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
providing a five-level inverter comprising a first switch, a second switch, a third switch and a fourth switch connected in series, wherein:
the first switch is connected to a first voltage potential equal to E/2;
the fourth switch is connected to a second voltage potential equal to −E/2;
a common node of the third switch and the fourth switch is connected to a neutral point through a first bidirectional switch;
a common node of the first switch and the second switch is connected to the neutral point through a second bidirectional switch;
a common node of the second switch and the third switch is connected to an input of an L-C filter; and
the common node of the third switch and the fourth switch is connected to the common node of the first switch and the second switch through a flying capacitor, and wherein a voltage across the flying capacitor is equal to E/4; and
supplying control signals to the first switch, the second switch, the third switch, the fourth switch, the first bidirectional switch and the second bidirectional switch, wherein the control signals are configured such that five voltage potentials are produced at the input of the L-C filter, and wherein the five voltage potentials are E/2, E/4, 0, −E/4 and −E/2, and wherein the second bidirectional switch comprises two switches connected in series, and wherein at least one switch of the second bidirectional switch is always on when voltages at the input of the L-C filter are equal to E/2, E/4 and 0.

2. The method of claim 1, wherein:
the first bidirectional switch comprises a fifth switch and a sixth switch in a back-to-back connection; and
the second bidirectional switch comprises a seventh switch and an eighth switch in a back-to-back connection.

3. The method of claim 2, further comprising:
a first diode connected in parallel with the first switch;
a second diode connected in parallel with the second switch;
a third diode connected in parallel with the third switch; and
a fourth diode connected in parallel with the fourth switch
a fifth diode connected in parallel with the fifth switch;
a sixth diode connected in parallel with the sixth switch;
a seventh diode connected in parallel with the seventh switch; and
an eighth diode connected in parallel with the eighth switch.

4. The method of claim 3, further comprising:
supplying the control signals in one switching cycle such that:
the first switch, the second switch, the fifth switch and the eighth switch are turned on and a voltage at the input of the L-C filter is equal to E/2;
the first switch, the third switch, the fifth switch and the eighth switch are turned on and the voltage at the input of the L-C filter is equal to E/4;
the third switch, the fifth switch, the sixth switch and the eighth switch are turned on and the voltage at the input of the L-C filter is equal to zero;
the second switch, the sixth switch, the seventh switch and the eighth switch are turned on and the voltage at the input of the L-C filter is equal to zero;
the third switch, the sixth switch, the seventh switch and the eighth switch are turned on and the voltage at the input of the L-C filter is equal to −E/4; and
the third switch, the fourth switch, the sixth switch and the seventh switch are turned on and the voltage at the input of the L-C filter is equal to −E/2.

5. The method of claim 3, further comprising:
supplying the control signals in one switching cycle such that:

the first switch, the second switch, the fifth switch and the eighth switch are turned on and a voltage at the input of the L-C filter is equal to E/2;

the second switch, the fifth switch, the sixth switch and the eighth switch are turned on and the voltage at the input of the L-C filter is equal to E/4;

the third switch, the fifth switch, the sixth switch and the eighth switch are turned on and the voltage at the input of the L-C filter is equal to zero;

the second switch, the sixth switch, the seventh switch and the eighth switch are turned on and the voltage at the input of the L-C filter is equal to zero;

the second switch, the fourth switch, the sixth switch and the seventh switch are turned on and the voltage at the input of the L-C filter is equal to −E/4; and the third switch, the fourth switch, the sixth switch and the seventh switch are turned on and the voltage at the input of the L-C filter is equal to −E/2.

6. The method of claim 3, further comprising:

supplying the control signals in one switching cycle such that:

the first switch, the second switch, the fifth switch and the eighth switch are turned on and a voltage at the input of the L-C filter is equal to E/2;

the first switch, the third switch, the fifth switch and the eighth switch are turned on and the voltage at the input of the L-C filter is equal to E/4;

the second switch, the fifth switch, the sixth switch and the eighth switch are turned on and the voltage at the input of the L-C filter is equal to E/4;

the third switch, the fifth switch, the sixth switch and the eighth switch are turned on and the voltage at the input of the L-C filter is equal to zero;

the second switch, the sixth switch, the seventh switch and the eighth switch are turned on and the voltage at the input of the L-C filter is equal to zero;

the third switch, the sixth switch, the seventh switch and the eighth switch are turned on and the voltage at the input of the L-C filter is equal to −E/4;

the second switch, the fourth switch, the sixth switch and the seventh switch are turned on and the voltage at the input of the L-C filter is equal to −E/4; and the third switch, the fourth switch, the sixth switch and the seventh switch are turned on and the voltage at the input of the L-C filter is equal to −E/2.

\* \* \* \* \*